US010965447B1

(12) United States Patent
Prokopenya et al.

(10) Patent No.: US 10,965,447 B1
(45) Date of Patent: Mar. 30, 2021

(54) DISTRIBUTED BLOCKCHAIN-TYPE IMPLEMENTATIONS CONFIGURED TO MANAGE TOKENIZED DIGITAL ASSETS AND IMPROVED ELECTRONIC WALLETS, AND METHODS OF USE THEREOF

(71) Applicant: Currency Com Limited, Gibraltar (GI)

(72) Inventors: Viktor Prokopenya, London (GB); Artsiom Mikhasiou, Minsk (BY); Il'ya Fomenok, Minsk (BY); Aliaksandr Kotseleu, Minsk (BY); Siarhei Sinila, Minsk (BY)

(73) Assignee: Currency Com Limited, Gibraltar (GI)

( * ) Notice: Subject to any disclaimer, the term of this patent is extended or adjusted under 35 U.S.C. 154(b) by 0 days.

(21) Appl. No.: 17/017,438

(22) Filed: Sep. 10, 2020

Related U.S. Application Data

(60) Provisional application No. 62/898,015, filed on Sep. 10, 2019, provisional application No. 62/898,017, filed on Sep. 10, 2019.

(51) Int. Cl.
*H04L 9/06* (2006.01)
*H04L 9/32* (2006.01)
*G06Q 20/36* (2012.01)
*H04L 9/08* (2006.01)

(52) U.S. Cl.
CPC ........... *H04L 9/0643* (2013.01); *G06Q 20/36* (2013.01); *H04L 9/0877* (2013.01); *H04L 9/3265* (2013.01); *H04L 2209/38* (2013.01)

(58) Field of Classification Search
CPC ... H04L 9/0643; H04L 9/3265; H04L 9/0877; H04L 2209/38; G06Q 20/36
See application file for complete search history.

(56) References Cited

U.S. PATENT DOCUMENTS

| | | | | |
|---|---|---|---|---|
| 10,158,480 B1 * | 12/2018 | Winklevoss | ........ | H04L 12/2803 |
| 10,373,129 B1 * | 8/2019 | James | .................. | H04L 9/3247 |
| 10,373,158 B1 * | 8/2019 | James | .................. | G06Q 20/40 |
| 10,521,780 B1 * | 12/2019 | Hopkins, III | .......... | G06Q 20/10 |
| 2006/0069639 A1 * | 3/2006 | Kalt | ........................ | G06Q 40/04 |
| | | | | 705/37 |

(Continued)

*Primary Examiner* — Darren B Schwartz
(74) *Attorney, Agent, or Firm* — Greenberg Traurig, LLP

(57) ABSTRACT

In some embodiments, the present description provides a computer-based system having a dual-exchange cryptographically-secured platform (DECSP); where the DECSP includes: a first-type cryptographically-secured platform (first-type CSP) and a second-type cryptographically-secured platform (second-type CSP); where the first-type CSP includes a first computing device; where the second-type CSP includes a second computing device; where the first computing device is connected to a blockchain and configured to issue crypto-tokens associated with a non-crypto asset, perform blockchain-based activities, and automatically transmit an instruction associated with the non-crypto asset to a second computing device in response to an issuance of the crypto-token by the first computing device; where the second computing device is configured to: receive the instruction associated with the one non-crypto asset from the first computing device and automatically communicate with a non-crypto asset electronic marketplace to execute a transaction associated with the non-crypto asset to obtain a position in the non-crypto asset.

16 Claims, 16 Drawing Sheets

(56) References Cited

U.S. PATENT DOCUMENTS

| | | | |
|---|---|---|---|
| 2010/0114754 A1* | 5/2010 | Silvermann | G06Q 40/04 |
| | | | 705/37 |
| 2016/0234026 A1* | 8/2016 | Wilkins | G06F 21/64 |
| 2016/0283941 A1* | 9/2016 | Andrade | H04L 9/3247 |
| 2016/0300222 A1* | 10/2016 | Yang | G06Q 20/065 |
| 2016/0358161 A1* | 12/2016 | Cobban | G06Q 30/0201 |
| 2017/0011460 A1* | 1/2017 | Molinari | G06F 21/645 |
| 2017/0337534 A1* | 11/2017 | Goeringer | G06Q 50/188 |
| 2018/0218176 A1* | 8/2018 | Voorhees | H04L 9/3213 |
| 2019/0012660 A1* | 1/2019 | Masters | G06Q 20/381 |
| 2019/0130483 A1* | 5/2019 | de Jong | G06Q 20/02 |
| 2019/0205881 A1* | 7/2019 | Borzilleri | G06Q 20/36 |
| 2019/0207760 A1* | 7/2019 | Hennebert | H04L 9/0841 |
| 2019/0251629 A1* | 8/2019 | Gordon, III | G06Q 20/3821 |
| 2019/0333051 A1* | 10/2019 | Brogger | H04L 9/3239 |
| 2019/0340607 A1* | 11/2019 | Lynn | G06Q 20/3829 |
| 2019/0354945 A1* | 11/2019 | Mahajan | G06Q 20/381 |
| 2020/0042989 A1* | 2/2020 | Ramadoss | G06Q 20/102 |
| 2020/0042995 A1* | 2/2020 | Snow | G06Q 20/065 |
| 2020/0042996 A1* | 2/2020 | Mayblum | G06Q 20/3678 |
| 2020/0059362 A1* | 2/2020 | Brody | G06F 21/74 |
| 2020/0065899 A1* | 2/2020 | Fritsch | H04L 9/3239 |
| 2020/0250168 A1* | 8/2020 | Xu | G06F 16/2336 |
| 2020/0265516 A1* | 8/2020 | Xu | G06Q 20/3827 |
| 2020/0296093 A1* | 9/2020 | Hoyos | H04L 9/3247 |

* cited by examiner

DISTRIBUTED BLOCKCHAIN-TYPE IMPLEMENTATIONS CONFIGURED TO MANAGE TOKENIZED DIGITAL ASSETS AND IMPROVED ELECTRONIC WALLETS, AND METHODS OF USE THEREOF

CROSS-REFERENCE TO RELATED APPLICATIONS

This application claims priority to U.S. Provisional Application 62/898,015, filed on Sep. 10, 2019 and entitled "DISTRIBUTED BLOCKCHAIN-TYPE LEDGER IMPLEMENTATIONS CONFIGURED TO MANAGE TOKENIZED ASSETS," and U.S. Provisional Application 62/898,017, filed on Sep. 10, 2019 and entitled "DIGITAL WALLETS AND METHODS OF USE THEREOF" that are herein incorporated by reference in their entirety.

FIELD OF TECHNOLOGY

The exemplary embodiments relate to distributed blockchain-type implementations and electronic valets (eWallets).

SUMMARY OF THE DISCLOSURE

In some embodiments, the present description provides an exemplary computer-based system that includes at least the following components: a dual-exchange cryptographically-secured platform (DECSP); where the DECSP includes: a first-type cryptographically-secured platform (first-type CSP) and a second-type cryptographically-secured platform (second-type CSP); where the first-type CSP includes at least one first computing device; where the second-type CSP comprises at least one second computing device; where the at least one first computing device is operationally connected to a blockchain and configured to at least: that is operationally connected to a blockchain and configured to at least: i) issue at least one digital cryptographical token (crypto-token) associated with at least one non-crypto asset, ii) perform at least one blockchain-based activity with the at least one crypto-token, iii) automatically cause to cryptographically generate, on a blockchain, at least one first blockchain immutable record of the at least one blockchain-based activity with the at least one crypto-token, and iv) automatically transmit at least one instruction associated with the at least one non-crypto asset to the at least one second computing device of the second-type CSP in response to an issuance of the at least one crypto-token by the at least one first computing device of the first-type CSP; where the at least one second computing device of the second-type CSP is configured to at least: i) receive the at least one instruction associated with the at least one non-crypto asset from the at least one first computing device of the first-type CSP and ii) automatically communicate with at least one non-crypto asset electronic marketplace to execute at least one transaction associated with the at least one non-crypto asset based on the at least one instruction to obtain at least one position in the at least one non-crypto asset; and where the at least one first computing device of the first-type CSP, the at least one second computing device of the second-type CSP, or both, are configured to automatically link: i) the at least one blockchain-based activity with the at least one crypto-token and 2) the at least one position in the at least one non-crypto asset.

In some embodiments, the present description provides an exemplary computer-based method that includes at least: administering a dual-exchange cryptographically-secured platform (DECSP); where the DECSP includes: a first-type cryptographically-secured platform (first-type CSP) and a second-type cryptographically-secured platform (second-type CSP); where the first-type CSP includes at least one first computing device; where the second-type CSP comprises at least one second computing device; where the at least one first computing device is operationally connected to a blockchain and configured to at least: that is operationally connected to a blockchain and configured to at least: i) issue at least one digital cryptographical token (crypto-token) associated with at least one non-crypto asset, ii) perform at least one blockchain-based activity with the at least one crypto-token, iii) automatically cause to cryptographically generate, on a blockchain, at least one first blockchain immutable record of the at least one blockchain-based activity with the at least one crypto-token, and iv) automatically transmit at least one instruction associated with the at least one non-crypto asset to the at least one second computing device of the second-type CSP in response to an issuance of the at least one crypto-token by the at least one first computing device of the first-type CSP; where the at least one second computing device of the second-type CSP is configured to at least: i) receive the at least one instruction associated with the at least one non-crypto asset from the at least one first computing device of the first-type CSP and ii) automatically communicate with at least one non-crypto asset electronic marketplace to execute at least one transaction associated with the at least one non-crypto asset based on the at least one instruction to obtain at least one position in the at least one non-crypto asset; and where the at least one first computing device of the first-type CSP, the at least one second computing device of the second-type CSP, or both, are configured to automatically link: i) the at least one blockchain-based activity with the at least one crypto-token and 2) the at least one position in the at least one non-crypto asset.

In some embodiments, the at least one first computing device of the first-type CSP, the at least one second computing device of the second-type CSP, or both, include a non-transitory computer memory storing computer code that, when executed, causes the at least one first computing device of the first-type CSP, the at least one second computing device of the second-type CSP, or both, to automatically execute at least one know-your-customer (KYC) determination.

In some embodiments, the at least one first computing device of the first-type CSP is further configured to automatically cause to cryptographically generate, on the blockchain, at least one second blockchain immutable record of the at least one position in the at least one non-crypto asset that is cryptographically linked to the at least one crypto-token.

In some embodiments, the at least one first computing device of the first-type CSP is further configured to automatically verify a signature-of-trust of a node via which the at least one first computing device receives, from a user device associated with a user, at least one first request to perform the at least one blockchain-based activity with the at least one crypto-token.

In some embodiments, the exemplary computer-based system and the exemplary computer-based method may include and/or utilize at least one digital wallet (eWallet) including at least one first graphical user interface configured to allow a user to perform the at least one blockchain-based activity based on a user instruction related to the at least one position in the at least one non-crypto asset.

In some embodiments, the at least one first computing device of the first-type CSP is further configured to transmit at least one message, via the blockchain, from a first eWallet of a first user to a second eWallet of a second user.

In some embodiments, the first eWallet includes at least one second graphical user interface configured to allow the first user to indicate a maximum number of computational steps to be taken to transmit the at least one message, via the blockchain, to the second eWallet of the second user.

In some embodiments, the at least one first computing device of the first-type CSP is further configured to: secretly keep at least one private key of the at least one crypto-token and restrict a user to withdraw the at least one crypto-token to a corresponding value of at least one pre-determined cryptocurrency, at least one predetermined FIAT currency, or both.

In some embodiments, the at least one first computing device of the first-type CSP is further configured to track a monetary value of the at least one crypto-token based, at least in part, on a monetary value of the at least one position in the at least one non-crypto asset.

In some embodiments, the eWallet further includes at least one second graphical user interface configured to display a monetary value of the at least one crypto-token based, at least in part, on a monetary value of the at least one position in the at least one non-crypto asset.

BRIEF DESCRIPTION OF THE DRAWINGS

At least one embodiment of the disclosure is herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced. To facilitate understanding, identical reference numerals have been used, where possible, to designate identical elements that are common to the figures. The figures are not drawn to scale and may be simplified for clarity.

DETAILED DESCRIPTION OF ILLUSTRATIVE EXAMPLES

Figure 1:
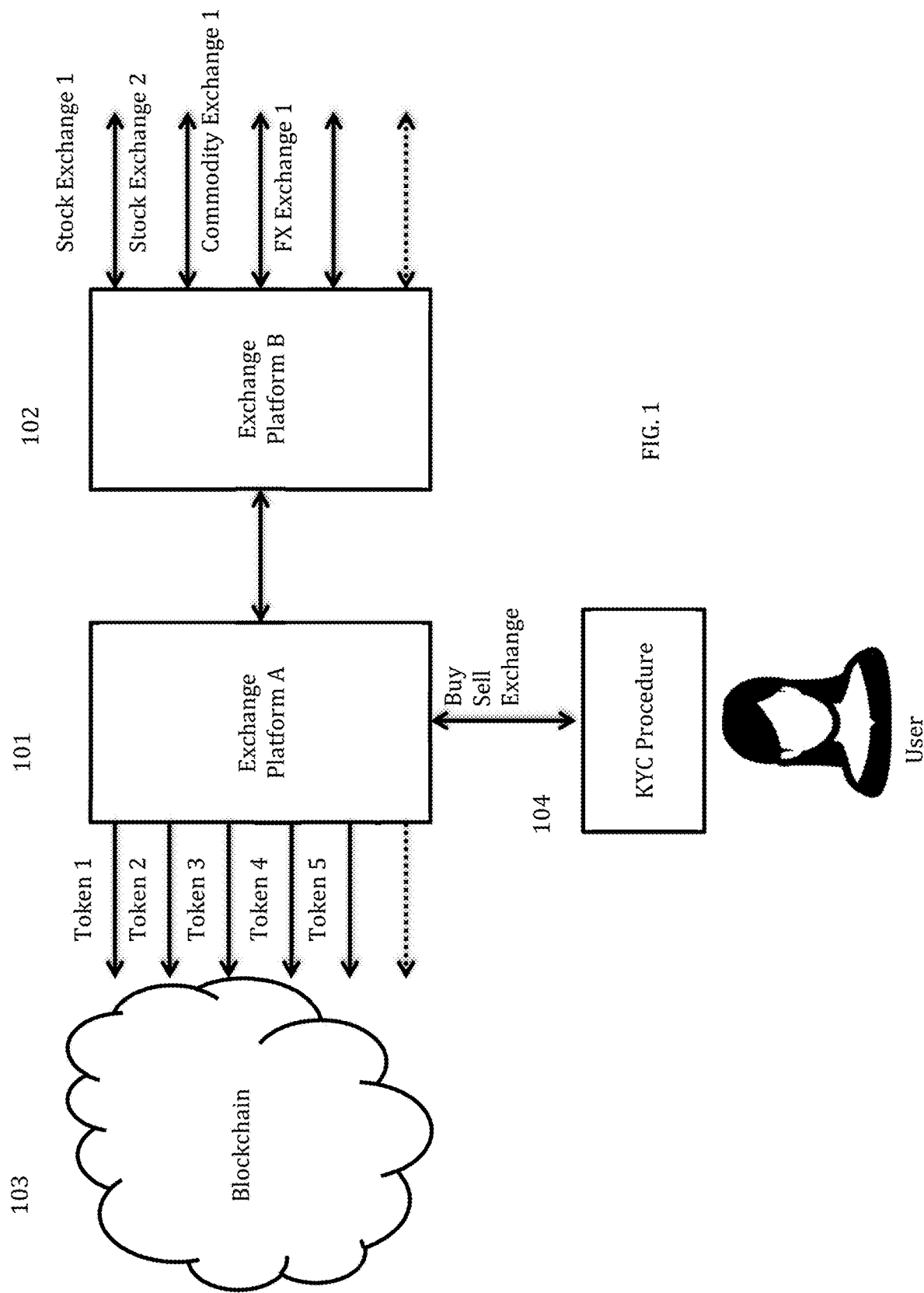
FIGS. 1-15 depict various aspects in accordance with at least some non-limiting embodiments of the present disclosure.

Embodiments of the present description, briefly summarized above and discussed in greater detail below, can be understood by reference to the illustrative embodiments of the description depicted in the appended drawings. It is to be noted, however, that the appended drawings illustrate only typical embodiments and are therefore not to be considered limiting of its scope, for the present disclosure may admit to other equally effective embodiments.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the description may be readily combined, without departing from the scope or spirit of the description. Further, when a particular feature, structure, or characteristic is described in connection with an implementation, it is submitted that it is within the knowledge of one skilled in the art to affect such feature, structure, or characteristic in connection with other implementations whether or not explicitly described herein. It is contemplated that elements and features of one embodiment may be beneficially incorporated in other embodiments without further recitation.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present description can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object-oriented programming), and the type of computer programming languages that may be used (e.g., C++, Objective-C, Swift, Java, Javascript, etc.). The aforementioned examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

As used herein, the term "user" shall have a meaning of at least one user.

For example, a typical decentralized ledger may consist of a list/database of immutable, shared, exactly replicated and synchronized data portions which are geographically spread across multiple sites, while maintaining integrity, availability and resiliency. Unlike a typical centralized system, there is no central administrator or single point of control.

In some embodiments, the exemplary inventive asset-tokenized distributed blockchain-type ledger implementations of the present disclosure are configured to provide real-time information and reduced errors and costs of infrastructure as compared to a typical centralized system. In some embodiments, the exemplary inventive asset-tokenized distributed blockchain-type ledger implementations of the present disclosure are configured to offer one or more functions of centralized decision making, mutability of contracts, linking crypto markets to value of the regulated, well developed and stable economies, etc.

In some embodiments, the exemplary inventive asset-tokenized distributed blockchain-type ledger implementations of the present disclosure with associated devices are configured to affect transactions involving Bitcoins and other cryptocurrencies into one another and also into (or between) so-called FIAT money or FIAT currency and vice versa.

In some embodiments, the exemplary asset-tokenized distributed blockchain-type ledger implementations of the present disclosure with associated devices are configured to operate in geographically distributed database form (e.g., a blockchain, Ethereum environment, etc.). In some embodiments, the exemplary inventive asset-tokenized distributed blockchain-type ledger implementations of the present disclosure with associated devices are configured to ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (e.g., the exemplary blockchain) may be distributed among multiple network nodes (e.g., running one or more servers administering the exemplary blockchain) within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. Typically, a central trust authority is therefore not required to vouch for the integrity of the distributed database hosted by multiple nodes in the network. In some embodiments, the exemplary inventive asset-tokenized distributed blockchain-type ledger implementations of the present disclosure with associated devices are configured to utilize at least one smart contracts-based administrative layer to administer blockchain-type distributed networks of the present disclosure.

In some embodiments, the exemplary inventive asset-tokenized distributed blockchain-type ledger implementations of the present disclosure may utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and *Byzantine* fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the exemplary inventive asset-tokenized distributed blockchain-type ledger implementations of the present disclosure include a combination of hardware and software designed to issue and perform exchange transactions with tokens whose value is kept fixed against that of the real assets (stocks, bonds, futures, commodities, indices, currencies, etc.). In some embodiments, the exemplary inventive asset-tokenized distributed blockchain-type ledger implementations of the present disclosure include one or more dual-exchange cryptographically-secured platforms ("DECSPs"). For example, an exemplary inventive DECSP may include 1) one or more first-type cryptographically-secured platform ("first-type CSP") that may be configured to issue crypto-tokens (digital crypto-tokens), also referenced herein as "tokens", and/or perform crypto-exchange operations, and 2) one or more second-type cryptographically-secured platform ("second-type CSP") that may be configured to link the token price with the price of the underlying asset(s) by, for example, without limitation, buying or selling contract(s) for difference at one or more electronic marketplaces of non-crypto assets such as, without limitation, electronic trading network (ECN) or over-the-counter, third market, or other off-exchange electronic trading venue (e.g., NASDAQ, NYSE, closed private trading exchanges, dark pool, etc.). For example, if a user buys an asset-linked token "smartABC" at an exemplary first-type CSP ("Exchange Platform A"), the Exchange Platform A electronically informs an exemplary second-type CSP ("Exchange Platform B") which would automatically and electronically submit an order, for example, without limitation, to buy a contract-for-difference (CFD) in the ABC asset to a computer of one or more of the traditional exchanges. For example, when the user wants to sell the token smartABC, the Exchange Platform B would automatically submit another instruction that would close the ABC contract's position.

In some embodiments, the exemplary inventive asset-tokenized distributed blockchain-type ledger implementations of the present disclosure are configured to allow the user to acquire the asset-linked tokens (e.g., smart ABC tokens) in any suitable manner such as, without limitation, using FIAT currencies, electronic money, cryptocurrencies, and/or exchanged for other tokens. In some embodiments, the exemplary inventive asset-tokenized distributed blockchain-type ledger implementations of the present disclosure are configured to generate the asset-linked tokens of the present disclosure utilizing one or more blockchains such as, without limitation, Bitshares, Ethereum, etc. In some embodiments, the exemplary inventive asset-tokenized distributed blockchain-type ledger implementations of the present disclosure are configured to only allow transactions between verified users who, for example, without limitation, have passed one or more KYC procedures (104) as detailed, for example, in one or more disclosures enclosed below.

In some embodiments, the exemplary inventive asset-tokenized distributed blockchain-type ledger implementations of the present disclosure are configured to allow to peg digital asset prices (prices of the asset-linked tokens) to the underlying asset(s).

FIG. 1 illustrate an illustrative architecture of an exemplary inventive DECSP of the exemplary asset-tokenized distributed blockchain-type ledger implementation of the present disclosure. For example, according to FIG. 1, the exemplary inventive DECSP may include, without limitation, the exemplary Exchange Platform A (101) and the exemplary Exchange Platform B (102). For example, the Exchange Platform A is configured/programmed to issue the asset-linked tokens in an exemplary the blockchain (103) (e.g., Bitshares, Ethereum, etc.) and allows user to perform buy, sell and/or other suitable exchange transactions. For example, prices of the asset-linked tokens are pegged to prices of underlying real assets provided by the exemplary Exchange Platform B (102). For example, if the market price of an asset ABC is X US dollars (USD), the exemplary Exchange Platform A may issue the asset-linked token (e.g., the exemplary smartABC token) at a price of (X+C) USD, where "C" is a commission/transaction fee. For example, when the user buys some amount of the smartABC tokens at the Exchange Platform A, the Exchange Platform A automatically sends an indication/message to the Exchange Platform B to open, for example, a long position in the ABS asset at the same value. For example, when the same user (or another user who may have obtained the smartABC tokens from the original user) sells the smartABC tokens back to the Exchange Platform A, the Exchange Platform B would automatically close the respective long position in the real asset ABC.

Figure 2:
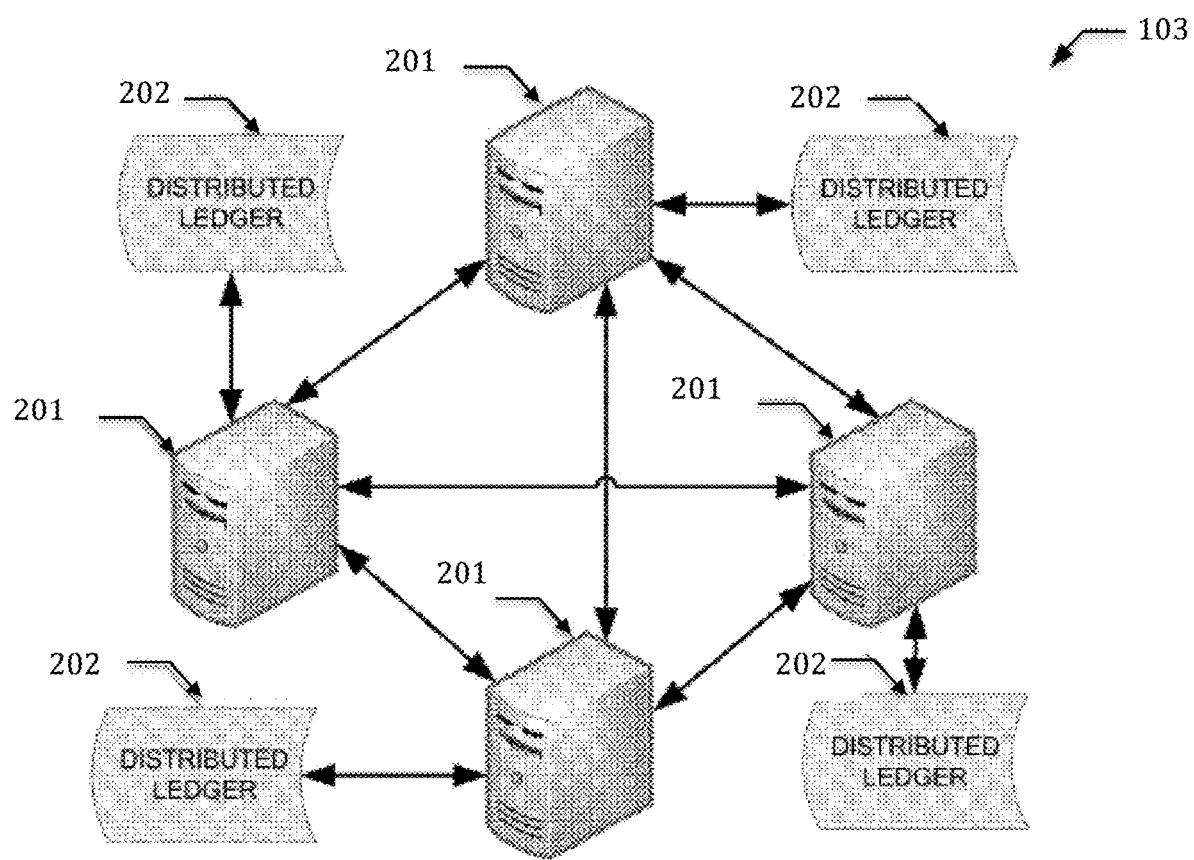

In the exemplary inventive asset-tokenized distributed blockchain-type ledger implementations of the present disclosure may utilize an exemplary blockchain, as shown in FIG. 2, that may include nodes 201 (where each node 201 represents one or more computing devices) that manage a blockchain ledger (202).

In some embodiments, one or more computers of the exemplary Exchange Platform A may manage and optionally store electronic wallets (eWallets), and the token flow between such eWallets. For example, the exemplary Exchange Platform A may be configured to issue the asset-linked tokens for one or more particular asset based, at least in part, on a current price recorded for the particular asset. In some embodiments, the exemplary Exchange Platform A may be programmed to dynamically/automatically adjust a quantity of the issued asset-linked tokens at an initial issuance step (e.g., up to the total number of the underlying shares of a stock);

In some embodiments, the exemplary inventive asset-tokenized distributed blockchain-type ledger implementations of the present disclosure are configured such that users of the exemplary Exchange Platform A may not access to their asset-linked tokens For example, the exemplary Exchange Platform A may be configured to generate a graphical user interface (e.g., a web interface, specific computer, and/or mobile-device application (with the own electronic address)) that shows a number of owned tokens and allow the user an ability to sell the tokens (all or some quantity) back to the Exchange Platform A.

In some embodiments, the exemplary inventive asset-tokenized distributed blockchain-type ledger implementations of the present disclosure are configured such that computer(s) of the exemplary Exchange Platform A may keep (store) all private keys for the user.

Figure 3:
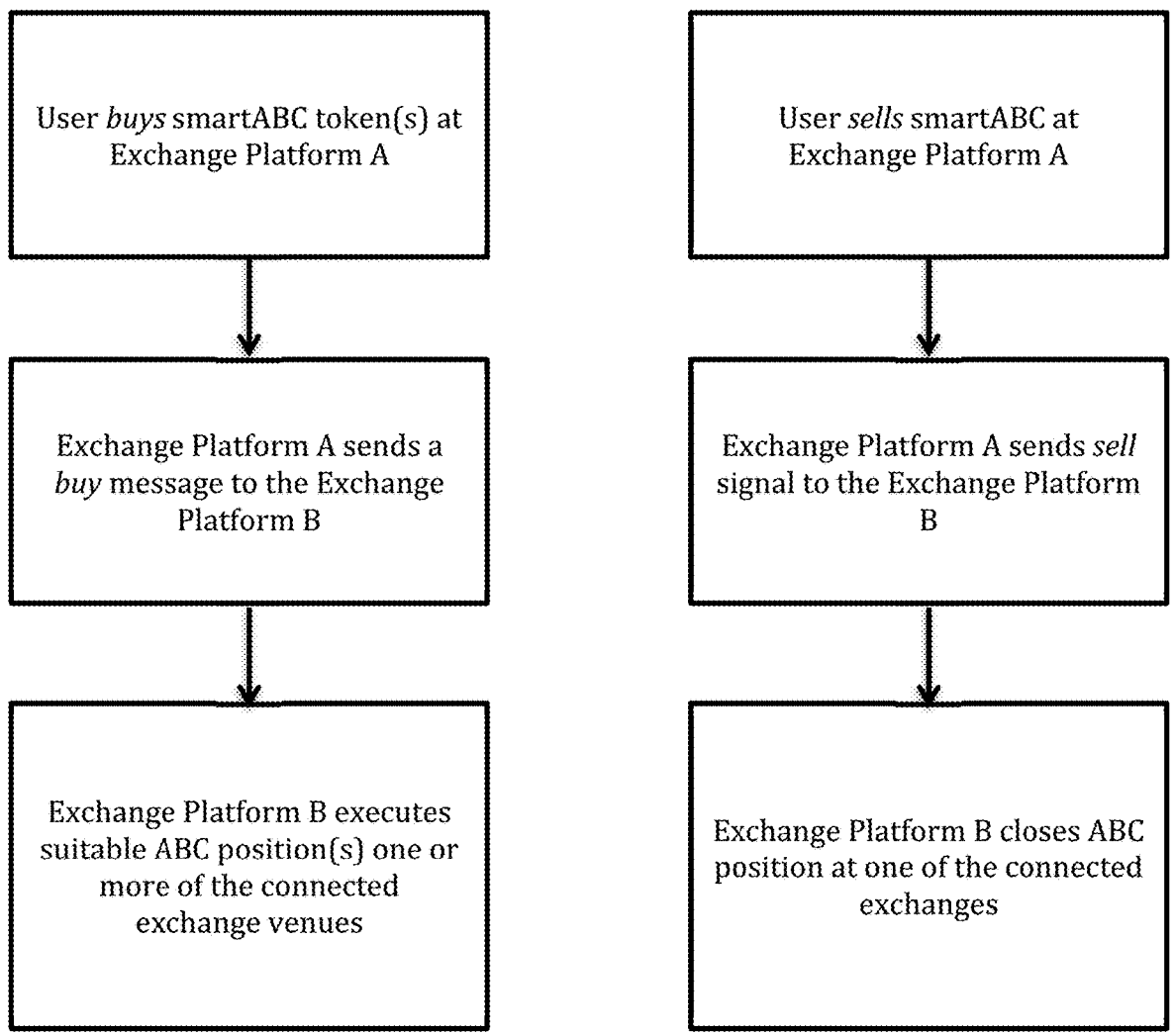

FIG. 3 provides an exemplary workflow of interactions between the exemplary Exchange Platform A and the exemplary Exchange Platform B when a user obtains (e.g., buys) (301) the smartABC tokens from the exemplary Exchange Platform A, and disposes (e.g., sells) (302) at least a portion of the same smartABC tokens to the exemplary Exchange Platform A.

Illustrative Examples of Some Inventive Methods of the Blockchain-Driven Issuance of the Asset-Linked Tokens of the Present Disclosure For example, in some embodiments, the exemplary inventive asset-tokenized distributed blockchain-type ledger implementations of the present disclosure are configured to issue a limited quantity of the asset-linked tokens. For example, without limitation, the limited quantity may be defined based at least one of:
i) asset (e.g., all stock issued by a company ABC, car(s), building(s), etc.),
ii) asset type (e.g., stock, bond, building, car, etc.),
iii) a combination of assets, or
iv) any combination thereof.

For example, the asset-let linked tokens may be a limited quantity of tokens that may exist within the realm of an existing coin and/or blockchain (e.g., Ether, Bitcoin, Ripple, etc.). For example, in some embodiments, the exemplary Exchange Platform A may issue the asset-linked tokens of the present disclosure based, at list in part, on an exemplary methodology of the User-Issued Assets of the Bitshares (https://bitshares.org) which are custom tokens registered on the Bitshares platform. For example, a user-issuer of such a User-Issued asset may publicly name, describe, and distributes such tokens, and can specify customized requirements, such as an approved whitelist of accounts permitted to hold the tokens, or the associated trading and transfer fees. For example, the exemplary Exchange Platform A may be configured to utilize, at least in part of its operation, BitShares' software routine(s) (BitShares Blockchain Foundation, Slovenia) such as, without limitation, from Bitshares' github routine library (e.g., see asset.py) to issue the asset-linked tokens of the present disclosure.

For example, in some embodiments, the exemplary Exchange Platform A may issue the asset-linked tokens of the present disclosure based, at list in part, on an exemplary methodology of the ERC20 contract of the Ethereum blockchain (Solidity). For example, the exemplary Exchange Platform A, when issuing the asset-linked tokens of the present disclosure based, at least in part, on the Ethereum methodology, may be configured to store asset(s)'s prices in the Ethereum blockchain. For example, the exemplary Exchange Platform A may be configured to, at least, without limitation, convert data string to a hexadecimal form using a suitable converter, and then, use the resulted hexadecimal number in the data field, for example, in the Solidity code (contract-oriented programming language for writing smart contracts) by starting the string with "0x". An illustrative, non-limiting example of such string is 0x537461636b45786368616e6765.

For example, in some embodiments, the exemplary inventive asset-tokenized distributed blockchain-type ledger implementation of the present disclosure utilizing an exemplary Ethereum-based blockchain, the exemplary Exchange Platform A may be configured to store transactions as signed data packages of messages to be sent from one account to another account on the blockchain. For example, an illustrative transaction may contain identification of a recipient of the message; a signature identifying the sender (proving the intention to send the message via the blockchain to the recipient); a "VALUE" field (e.g., identifying an amount of wei to transfer from the sender to the recipient (e.g., $10^{18}$ Wei=1 Ether); a data field (which can contain the message sent to a smart contract); a startGAS value (which represents a maximum number of computational steps the transaction execution is allowed to take (metering unit of Ethereum Virtual Machine (EVM) or the World Computer; and a GASprice value (which represents the fee the sender is willing to pay for gas (for example, one unit of gas may corresponds to the execution of one atomic instruction (a computational step) (e.g., for example, a multiplication (MUL) consumes 5 gas and an addition (ADD) consumes 3 gas).

An Illustrative, Non-Limiting Asset-Tokenized Distributed Blockchain-Type Ledger Implementation #1 of the Present Disclosure For example, the exemplary inventive asset-tokenized distributed blockchain-type ledger implementation #1 of the present disclosure may be in the form of a centralized exchange without asset-linked tokens withdrawal capability on the part of users/clients. For example, when a client deposits USD or BTC amounts, these funds are transferred to the possession of the exemplary Exchange Platform A and managed as records in the ledger of the present disclosure. For example, when a user purchases a asset (e.g., a quantity of shares in a company ABC), the exemplary Exchange Platform A issues new smartABC token(s) and makes a new record in the blockchain/ledger database. For example, the smartABC token(s) is/are visible on the blockchain, but private keys remain in the possession of the exchange, so the client/user cannot withdraw their smartABC token(s). In this type of implementation, withdrawal may be available only for FIAT and classical cryptocurrencies (e.g., USD, EUR, BTC, ETH, etc.).

An Illustrative, Non-Limiting Asset-Tokenized Distributed Blockchain-Type Ledger Implementation #2 of the Present Disclosure For example, the exemplary inventive asset-tokenized distributed blockchain-type ledger implementation #2 of the present disclosure may be in the form of a centralized exchange allowing an asset withdrawal capability to users/clients. At least some embodiments of the implementation #2 of the present disclosure may be configured to conduct anti-money laundering procedure(s) and offer their clients an option to directly trade and/or exchange their assets via, for example, without limitation, trading and/or exchanging their respective asset-linked token(s) (e.g., trading smartABC token(s) for smartDEF token(s), corresponding to trading at least portion of the corresponding ABC asset for at least portion of the DEF asset).

An Illustrative, Non-Limiting Asset-Tokenized Distributed Blockchain-Type Ledger Implementation #3 of the Present Disclosure For example, the exemplary inventive asset-tokenized distributed blockchain-type ledger implementation #3 of the present disclosure may be in the form of a centralized exchange allowing an asset withdrawal capability to users/clients and storing/posting a price feed (a digital order book of asset prices) in the ledger/blockchain of the present disclosure.

An Illustrative, Non-Limiting Asset-Tokenized Distributed Blockchain-Type Ledger Implementation #4 of the Present Disclosure For example, the exemplary inventive asset-tokenized distributed blockchain-type ledger implementation #4 of the present disclosure may be in the form of a combination of a hybrid exchange (e.g., a decentralized storage of tokenized assets and the centralized order book). For example, some embodiments of the implementation #4 of the present disclosure may be configured in accordance with one or more implementations detailed herein. For example, the exemplary inventive asset-tokenized distributed blockchain-type ledger implementation #4 of the present disclosure may be configured to allow the order execution only when users are online and the tokenized assets of the present disclosure may be stored on the users' side.

An Illustrative, Non-Limiting Asset-Tokenized Distributed Blockchain-Type Ledger Implementation #5 of the Present Disclosure For example, the exemplary inventive asset-tokenized distributed blockchain-type ledger implementation #5 of the present disclosure may be in the form of a combination of a distributed blockchain-type ledger/blockchain for storing the tokenized assets and a distributed blockchain-type ledger/blockchain for transactions (the decentralized execution).

At least some embodiments of at least one of the illustrative implementations #1 to #5 T may be configured to implement a mandatory KYC procedure.

At least some embodiments of at least one of the illustrative implementations #1 to #5 T may be configured so that tokenized assets issued by the exemplary Exchange Platform A are tokens on the exemplary blockchain of the present disclosure.

At least some embodiments of at least one of the illustrative implementations #1 to #5 T may be configured so that tokenized asset deposits are stored in the decentralized blockchain-type ledger/blockchain.

At least some embodiments of at least one of the illustrative implementations #1 to #5 T may be configured so that regular cryptocurrency deposits (e.g., BTC, ETH) are stored in the decentralized blockchain-type ledger/blockchain.

At least some embodiments of at least one of the illustrative implementations #1 to #5 T may be configured to allow Possibility to deposit/withdraw cryptocurrencies.

At least some embodiments of at least one of the illustrative implementations #1 to #5 T may be configured so that orders are executed in the decentralized manner (i.e., various trading venues).

At least some embodiments of at least one of the illustrative implementations #1 to #5 T may be configured so that the price feed (order book) is stored in the decentralized blockchain-type ledger/blockchain.

At least some embodiments of at least one of the illustrative implementations #1 to #5 T may be configured to invoke an open API to obtain real life market date on assets.

An Illustrative, Non-Limiting Example of Transactions Related to Tokenized Asset of the Present Disclosure The illustrative example is based on at least the following assumptions:
i) a tokenized ABC asset,
ii) the smartABC token already exists and is stored in the memory address of the exemplary Exchange Platform A,
iii) a user has passed a verification procedure (e.g., KYC procedure).
iv) the user has opened an account with the exemplary Exchange Platform A in either FIAT currency (USD) or cryptocurrency (BTC) (e.g., the user deposited 500$ to their account), and
iv) a transaction fee is 1%.

The exemplary inventive asset-tokenized distributed blockchain-type ledger implementation of the present disclosure may be configured so that one or more of the following activities can take place to execute transactions:

1) after the user logs in, a software platform of the exemplary implementation may display a list of available asset-linked tokens for buying and their prices (the exemplary Exchange Platform A receives prices directly from the Exchange Platform B and the price of the smartABC token is equal to the price of ABC asset);

2) the software platform of the exemplary implementation may be programmed to receive an indication that the user wants (e.g., the user clicks on "buy" button) to buy the smartABC token at the price of $200 (the same as the price of ABC asset at the Exchange Platform B);

3) the software platform of the exemplary implementation may be programmed to display one or more options for buying and the quantity (e.g., the user selects to buy 1 smartABC token);

4) the software platform of the exemplary implementation may be programmed to calculate price for the purchase ($200×1=$200);

5) the software platform of the exemplary implementation may be programmed to calculate the transaction fee (purchase price×1%=$200×0.01=$2);

6) the software platform of the exemplary implementation may be programmed to calculate the final price that the user should pay (e.g., purchase price+fee=$200+$2=$202);

7) the software platform of the exemplary implementation may be programmed to display final price and its constituents (e.g., calculated price and fee);

8) the software platform of the exemplary implementation may be programmed to receive the user acceptance of the buy transaction; and 9) the software platform of the exemplary implementation may be programmed to perform one or more of the following activities to execute the and record transaction in the exemplary distributed leger/blockchain of the present disclosure and cause to adjust the state of the user's eWallet accordingly:

a) withdrawing funds from USD account (the remaining balance is $500−$202=$298), b) transferring 1 smartABC token from, for example, when ABC assets is a group of shares, a corporate's memory address to the created customer address;

c) creating a record in the blockchain containing the fact of transferring the ABC asset and its price for the current timestamp; and d) initiating, by the exemplary Exchange Platform B, a suitable trading order for achieve a particular position in the ABC asset.

Table 1 provides an exemplary implementation of a smart contract structured to effectuate storing and posting the price information to the exemplary blockchain of the present disclosure.

TABLE 1

```
function transfer2(address _to, uint256 _value, string _price)
returns (boot success) {
    //Default assumes totalSupply can't be over max (2^256 - 1).
    //If your token leaves out totalSupply and can issue more
tokens as time goes on, you need to check if it doesn't wrap.
    //Replace the if with this one instead
    //if (balances[msg.sender] >= _value && balances[_to] +
_value > balances[_to]) {
    if (balances[msg.sender] >= _value && _value > 0) {
        balances[msg.sender] -= _value;
        balances[_to] += _value;
```

TABLE 1-continued

```
        Transfer(msg.sender, _to, _value);
        Price(msg.sender, _to, _price);
        return true;
    } else { return false; }
}
```

Figure 4:
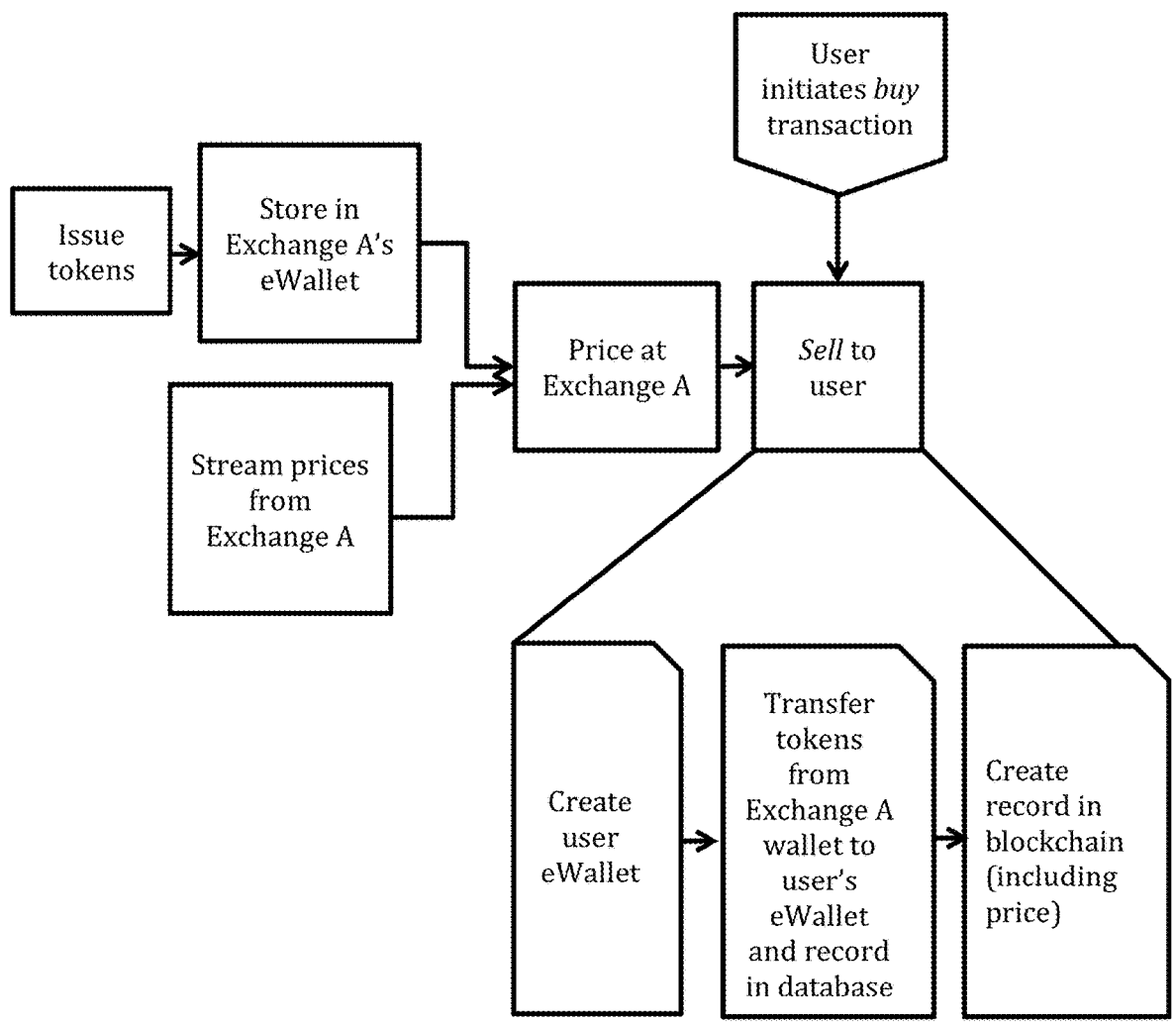

FIG. 4 provides an illustrative flowchart of the exemplary Exchange Platform A in accordance with at least one embodiment of the present disclosure.

Figure 5:
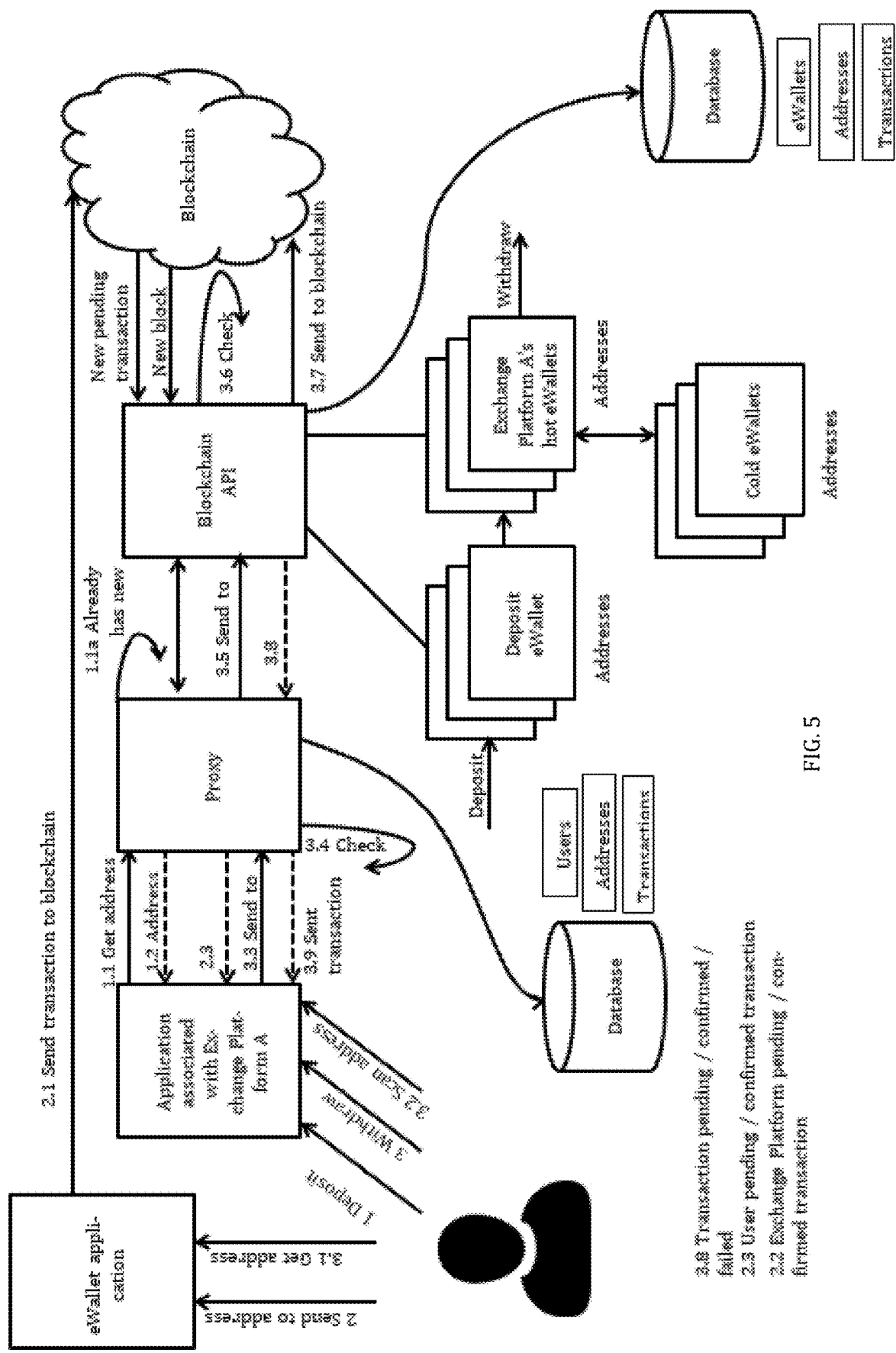

FIG. 5 provides an illustrative architecture (hardware-software) and illustrative data flows of an exemplary implementation in accordance with at least one embodiment of the present disclosure. For example, the deposit of digital currency by the user to the Exchange Platform A (buying a token) is shown by the data flows 1 and 2 in FIG. 5 (see also FIG. 6). The withdrawal process is illustrated by the data flow 3. The user is provided a memory address of his/her eWallet application (3.1) and the exemplary Exchange Platform A obtains from the user such address (3.2) (e.g., via scanning QR code, inserting a number, or manually entry by the user). In some embodiments, the exemplary Exchange Platform A communicates the proposed transaction through the Proxy and Blockchain API units to the exemplary blockchain (3.3-3.7). In some embodiments, the exemplary Blockchain API returns a response (3.8) on the status of the transaction (e.g., pending, confirmed, or failed). For example, when the transaction status becomes successful, the Proxy unit may be configured to send a confirmation (3.9) to the exemplary Exchange Platform A application.

In some embodiments, the exemplary Proxy unit may be operationally connected to the exemplary Database #1 where the data related to the user's interaction with the exemplary Exchange Platform A is stored (e.g., information about user's account(s) and activity (e.g., transactions, addressed, balances)).

In some embodiments, the exemplary Blockchain API may be operationally connected to (e.g., programmed to query) the exemplary Database #2 where the blockchain related information is stored: eWallets, addresses, transactions, etc. For example, the exemplary Blockchain API unit (hardware and/or software), without limitation, is configured to at least perform operations with eWallets and digital currency addresses such as, without limitation, obtaining new addresses for depositing digital currencies by users, initializing transactions, providing currency flows between "hot" and "cold" eWallets (for example, the hot eWallets may belong to the exemplary implementation of the present disclosure, although they may be "logically" structured as being signed to users; the cold eWallets may physically belong to users, (e.g., separate devices (e.g., USB, smart phone) and/or software).

In some embodiments, the exemplary Proxy unit is in the form of a hub (hardware and/or software) which, for example, without limitation, is configured to at least maintain users' accounts, control the balance and status information, etc.

FIG. 6 provides an illustrative flowchart of an exemplary digital asset deposit procedure in accordance with at least one embodiment of the present disclosure. For example, when a user wants to deposit digital currency (e.g., buy tokens), the exemplary implementation of the present disclosure may be configured to provide the list of available digital currencies (e.g., users open the application and request the list). For example, the exemplary implementation of the present disclosure may be configured to send a request to the exemplary Proxy unit, which retrieves the list from the Database (e.g., FIG. 5) and sends the list back to the application interface. For example, the exemplary implementation of the present disclosure may be configured to display, vial one or more specifically programmed GUI(s), the list of available digital currencies to the user. When the exemplary implementation of the present disclosure receives the user's selection of desirable digital currency, the Proxy unit may request address to which the selected digital assets will be deposited provided by the exemplary Blockchain API. For example, the exemplary Blockchain API may permanently link the user's digital presence with the generated address which may be also used for the next funding. For example, in some embodiments, if the user requests a new address (e.g., the user wishes to buy a token having zero balance of that token), the new one will be generated. For example, the exemplary Blockchain API may be configured to send the memory address to the exemplary implementation of the present disclosure allowing the user to initiate the transfer. For example, the exemplary implementation of the present disclosure may be programmed to notify the user when the transaction is added to the block of the exemplary blockchain/ledger. For example, upon receiving a request from the user, the exemplary Proxy unit may be configured to request the transaction's status from the exemplary Blockchain API (e.g., the exemplary blockchain of the present disclosure may be configured to monitor all corporate addresses and addresses assigned to users). For example, the exemplary implementation of the present disclosure may be further programmed to update the user's balance and notify the user about the successful funding.

In some embodiments, the exemplary inventive asset-tokenized distributed blockchain-type ledger implementations of the present disclosure may be configured to filter transactions based on transaction value and type of goods prior to acceptance rules. In some embodiments, the exemplary inventive asset-tokenized distributed blockchain-type ledger implementations of the present disclosure may a) compare and/or rate: 1) signatures-of-trust of the exemplary sub-entity submitted by various entities of the network-of-trust and/or 2) own signature-of-trust of the exemplary sub-entity with one or more signatures-of-trust of the exemplary sub-entity submitted by other entities, and b) then accept or reject a particular transaction based at least in part on the comparison and/or rating.

In some embodiments, the exemplary inventive asset-tokenized distributed blockchain-type ledger implementations of the present disclosure with associated devices represent technological solutions that, for example, without limitation, reduce volume of data being transacted over the exemplary asset-tokenized distribute ledger/blockchain. In some embodiments, the exemplary inventive asset-tokenized distributed blockchain-type ledger implementations of the present disclosure with associated devices represent technological solutions that, for example, without limitation, reduce amount of processing power. For example, given that the number of issued tokens may be rather large (e.g., 10, 100, 1000, 2000, or more), the exemplary inventive asset-tokenized distributed blockchain-type ledger implementations of the present disclosure with associated devices provide safety in storing digital assets and controlling flows between eWallet of various types (e.g., cold and hot). For example, the exemplary inventive asset-tokenized distributed blockchain-type ledger implementations of the present disclosure with associated devices may be configured to allow users to buy/sell/trade real assets in digitized form combining benefits of both types. For example, the exemplary inventive asset-tokenized distributed blockchain-type ledger implementations of the present disclosure with associated devices may be configured to allow users to buy/sell/trade real assets in jurisdictions where direct transactions with some types of real assets are not possible.

In some embodiments, the exemplary inventive asset-tokenized distributed blockchain-type ledger implementations of the present disclosure with associated devices may be configured such that for example, without limitation, the Exchange Platform B may be configured to execute leveraged and non-leveraged trading of real assets based on an electronic exchange to which the Exchange Platform B may be connected (e.g., a particular exchange may provide only the option without leverage), the availability of funds, and/or may be set manually. For example, configured to the available option, the exemplary Exchange Platform B may open a position in the ABC asset through one of the connected electronic exchanges upon receiving an indication/message from the exemplary Exchange Platform A that triggered when a user buys the smartABC token. For example, at the same time, the exemplary inventive asset-tokenized distributed blockchain-type ledger implementations of the present disclosure with associated devices may be configured to keep such operations hidden from the user, as they deal only with tokens smartABC and the exemplary Exchange Platform A.

Illustrative Examples of Distributed
Blockchain-Type Ledger Implementations
Configured to Manage Know-Your-Customer
(KYC) Certifications and/or Procedures to Prevent
Money-Laundering and/or Fraudulent Transactions In some embodiments, the exemplary inventive KYC-tailored distributed blockchain-type ledger implementations of the present disclosure are configured to provide real-time information and reduced errors and costs of infrastructure as compared to a typical centralized system. In some embodiments, the exemplary inventive KYC-tailored distributed blockchain-type ledger implementations of the present disclosure are configured to offer one or more functions of centralized decision making, mutability of contracts, linking crypto markets to value of the regulated, well developed and stable economies, etc.

In some embodiments, the exemplary inventive KYC-tailored distributed blockchain-type ledger implementations of the present disclosure with associated devices are configured to, for example without limitation, prevent money laundering transactions (anti-money laundering (AML) enforcement) and/or fraudulent transactions, such as, without limitation, transactions involving Bitcoins and other cryptocurrencies into one another and also into (or between) so-called FIAT money or FIAT currency and vice versa.

For example, one or more entities (e.g., 201 of FIG. 2) can be managed by one or more financial institutions (e.g., banks) who may have pre-determined KYC procedures based at least in part on AML rules and/or database(s) of suspicious activities, accounts, individuals, and companies—KYC-AML procedure(s). In some embodiments, exemplary KYC-AML procedure(s) are programmed to enforce compliance with anti-bribery and corruption regulations, including Title 18, USC 1956, Title 18, USC 1957, Title 18, USC 1960, Bank Secrecy Act, Anti-Money Laundering Act, Counter Terrorist Financing Act, Know Your Customer Act, The Patriot Act, Foreign Corrupt Practices Act (FCPA), Customer Information Program (CIP), similar laws/regulations and the like.

In some embodiments, the exemplary inventive KYC-tailored distributed blockchain-type ledger implementations of the present disclosure with associated devices are configured to operate in geographically distributed database form (e.g., a blockchain, Ethereum environment, etc.). In some embodiments, the exemplary inventive KYC-tailored distributed blockchain-type ledger implementations of the present disclosure with associated devices are configured to ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (e.g., the exemplary blockchain) may be distributed among multiple network nodes (e.g., running one or more servers administering the exemplary blockchain) within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. Typically, a central trust authority is therefore not required to vouch for the integrity of the distributed database hosted by multiple nodes in the network.

In some embodiments, the exemplary inventive KYC-tailored distributed blockchain-type ledger implementations of the present disclosure with associated devices are configured to utilize at least one smart contracts-based administrative layer to administer blockchain-type distributed networks of the present disclosure.

In some embodiments, the exemplary inventive KYC-tailored distributed blockchain-type ledger implementations of the present disclosure may utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive KYC-tailored distributed blockchain-type ledger implementations of the present disclosure may utilize smart contract architecture that can be implemented by replicated asset registries and contract execution using cryptographic hash chains and *Byzantine* fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the exemplary inventive KYC-tailored distributed blockchain-type ledger implementations of the present disclosure are configured to assist, for example, an exemplary entity (e.g., financial institution, governmental agency, industry agency, company, etc.) to perform its customer due diligence. In some embodiments, the exemplary inventive KYC-tailored distributed blockchain-type ledger implementations of the present disclosure are configured to allow the exemplary entity, via it controlled computing device, to sign one or more public keys of each affiliated sub-entity (e.g., customer of a financial institution, a subscriber of a publisher, etc.) with one or more entity's own digital signature and, then, add or cause to add the combined information to an exemplary blockchain.

For example, the exemplary entity either perform their own due diligence or trust the signatures of other entity(ies). In some embodiments, the exemplary inventive KYC-tailored distributed blockchain-type ledger implementations of the present disclosure are configured to utilize network-of-trusted nodes of a plurality of entities (e.g., financial institutions) to execute an exemplary KYC-tailored blockchain of the present disclosure. For example, in some embodiments, the exemplary inventive KYC-tailored distributed blockchain-type ledger implementations of the present disclosure provide a functionality (e.g., a smart contract) programmed to allow the exemplary entity to ban affiliated sub-entities (by e.g., a government) and add information about the ban to the exemplary KYC-tailored blockchain of the present disclosure.

In some embodiments, the exemplary inventive KYC-tailored distributed blockchain-type ledger implementations of the present disclosure with associated devices are configured to allow the exemplary entity such as a financial institution, to, for example, without limitation, manage risk(s) by making reasonable efforts to determine at least one of:
1) true identity of each affiliated sub-entity (e.g., customer),
2) beneficial ownership of account(s),
3) source(s) of funds,
4) reasonableness of operations, and/or
5) the like.

In some embodiments, the exemplary inventive KYC-tailored distributed blockchain-type ledger implementations of the present disclosure with associated devices are configured to allow entities to follow one or more KYC guidelines to prevent entities from being used, intentionally or unintentionally, by affiliated sub-entities for, for example, without limitation, money laundering and/or fraudulent purpose. For example, in some embodiments, the exemplary inventive KYC-tailored distributed blockchain-type ledger implementations of the present disclosure with associated devices are configured to perform at least one of the following operations: 1) collecting and analyzing identity information (e.g., OCR-recognition identity information from identity documents), 2) name matching against lists of known parties, 3) determination of the customer's risk, and etc.

In some embodiments, the exemplary inventive KYC-tailored distributed blockchain-type ledger implementations of the present disclosure with associated devices are configured such that the exemplary KYC-tailored blockchain of the present disclosure does not store profiles of the affiliated sub-entities (e.g., users' identities) and/or broadcast profiles of the affiliated sub-entities to nodes of the exemplary KYC-tailored blockchain; but, instead, the exemplary KYC-tailored blockchain, in its blocks, stores each affiliated sub-entity's "signature-of-trust." As referenced herein, the term "signature-of-trust," in its hashed or non-hashed form, includes information stored in a KYC-tailored blockchain of the present disclosure and identifying at least: 1) at least one entity that has performed KYC-type due diligence procedure and 2) information regarding the approved sub-entity.

In some embodiments, the KYC-information of a particular signature-of-trust can be based at least in part on one or more sub-entity's identifying characteristics such as, but not limited to:
1) Personal Information:
  i) Name,
  ii) Home Address (e.g., current address, past address(es)),
  iii) Phone Number(s),
  iv) Credit Card number(s),
  v) Bank Account Number(s),
  vi) Date of Birth;
2) Security Information and Identification Trait:
  i) Password(s),
  ii) Numerical Passcode(s),
  iii) Security Question(s),
  iv) Fingerprint(s),
  v) Swipe Pattern.

In some embodiments, other elements of KYC information may include a browser fingerprint, a computer fingerprint, an IP address, geographic IP location information, information associated with a payment, and/or a typing pattern. For example, the browser fingerprint may include a sub-entity agent, a screen resolution, a software plug-in, a time zone, a system language, whether Java is enabled, whether cookies are enabled, a site visited, or an IP address. In some embodiments, the computer fingerprint may include processor characteristic, a memory size of the machine, a value that is loaded at a key location, a value of a registry of a loaded operating system, an Ethernet MAC address, raw networking information, network information, a loaded program, or a log file. And the network information may include a network provider, whether an IP address is consistent with a known IP address, geographical proximity of an address registered with a payment instrument and the IP address as determined by an IP to geo-location service, whether or not a proxy is in use, whether a known bad IP address is in use, and whether the IP address is associated with a service provider who was associated with the sub-entity in the prior transaction.

In some embodiments, the exemplary inventive KYC-tailored distributed blockchain-type ledger implementations of the present disclosure with associated devices are configured such that in addition to sub-entities' signatures of trust, the exemplary KYC-tailored blockchain of the present disclosure may store a "network-of-trust"-type information that identify, for example, without limitation, a trustworthiness of a particular entity (e.g., data/statistics indicative of how often the particular entity has, correctly and/or incorrectly, rated/classified a particular affiliated sub-entity and/or a plurality of affiliated sub-entities). For example, the exemplary inventive KYC-tailored distributed blockchain-type ledger implementations of the present disclosure with associated devices are configured such that at least two segments of data circulated in the exemplary KYC-tailored blockchain:
1) results of KYC procedure approval of sub-entities by entities (e.g., a user U is approved by an institution I) and
2) the "network-of-trust" of entities (e.g., a user U is rated positively by institutions I1, I2, I3, . . . and negatively by J1, J2, J3, . . . ; and/or, an institution I has the misclassification ratio X % for the user U).

In some embodiments, a particular KYC procedure may involve, without limitation, at least one or more verifications of:

1) Email address: unique code is emailed to the user which must be clicked on to validate access,
2) Primary address: a pin number is mailed to address which much be entered upon login,
3) Bank account/credit card: for example, utilizing a specifically programmed API or another suitable service to: (i) make small deposit(s) to account(s) and/or (ii) withdraw small amount(s) from account(s)—which must be entered upon login,
4) Driver's License: license number is entered and validated against DMV database,
5) Social Security Number: a sub-entity uploads a copy of their social security number, and
6) Date of Birth: a sub-entity uploads a copy of their birth certificate.

In some embodiments, as it shown in FIG. 2, the exemplary inventive entity-controlled distributed blockchain-type ledger implementation of the present disclosure 200 may include entity nodes 201 (where each node 201 represents one or more computing devices associated with a particular entity) that manage the exemplary inventive KYC-tailored distribute ledger/blockchain 202 which is distributed among the nodes 201. For example, a customer (an affiliated sub-entity) provides one or more identification documents to a first entity 201 (e.g., a bank) by, for example, without limitation invoking an exemplary smart contract programmed to open an account with the first entity 201 (e.g., a bank) using the exemplary KYC-tailored distributed ledger/blockchain or another non-KYC-tailored blockchain. In turn, the first entity 701 (e.g., a bank) performs the customer due diligence and, if the provided information is accepted, the computing device associated with the first entity 201 signs (e.g., via one or more hash algorithms) the customer's public key with the first entity 201's digital signature and causes the customer's signature-of-trust to be added to the exemplary KYC-tailored distributed ledger. In turn, other entities of the network-of-trust may decide to trust the first entity's generated signature-of-trust for the particular sub-entity or to conduct their own due diligence (e.g., recommendation purpose). Consequently, the exemplary KYC-tailored distributed ledger is based on the established "network-of-trust" between entities.

Figure 7:
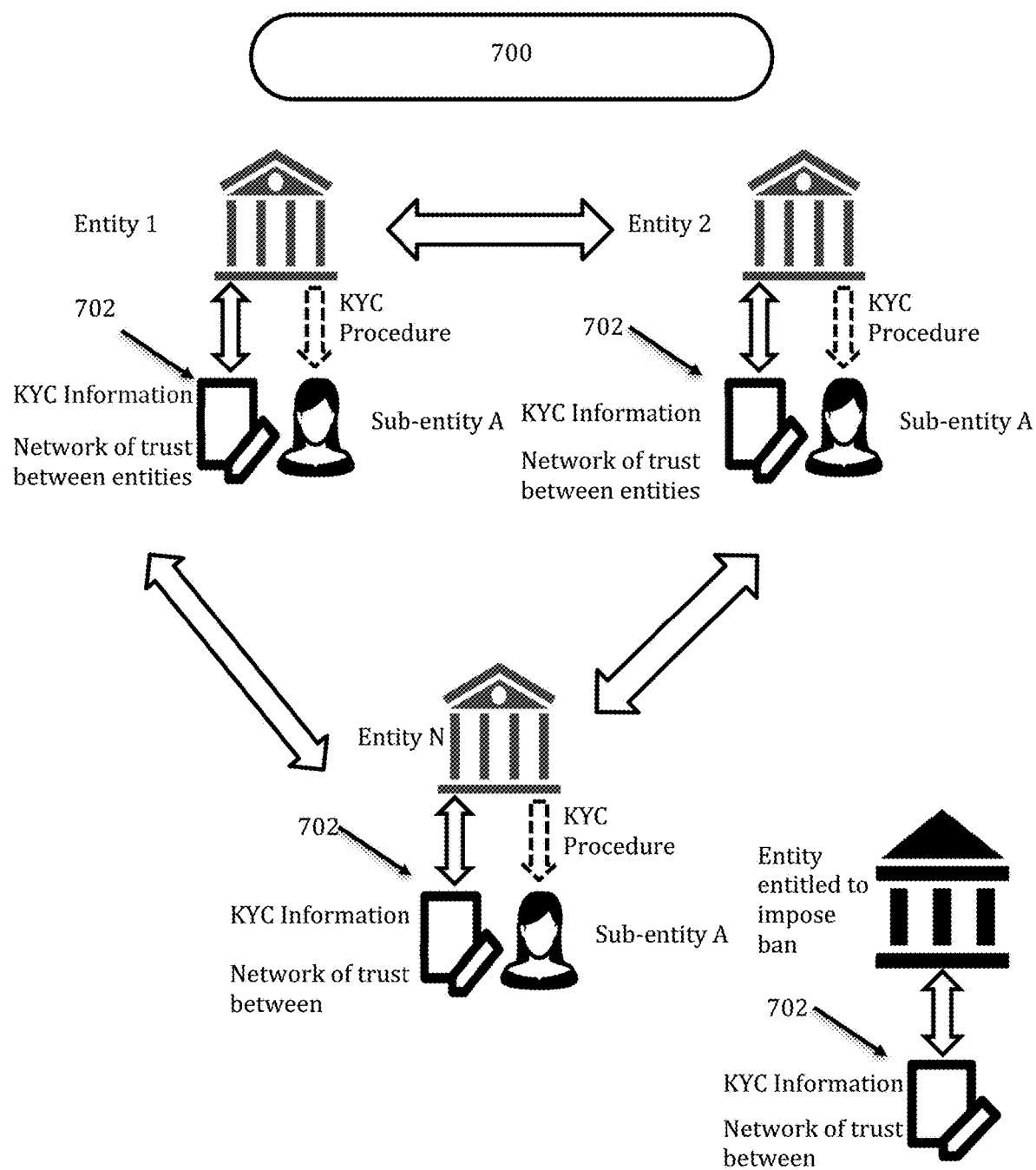

FIG. 7 illustrates an exemplary inventive KYC-tailored distributed blockchain-type ledger implementation of the present disclosure (700) with associated devices. For simplicity, only one sub-entity/user/customer (sub-entity A) is shown in FIG. 7. A person skilled in the arts would readily recognize that the various implementations of the present disclosure are not constrained by a number of entities and a number of sub-entities. As FIG. 7 illustrates, some implementations of the present disclosure may include one or more entities that are entitled, by the set-up of the network-of-trust, to ban one or more sub-entities from engaging in any transaction and/or interaction with any entity of the network-of-trust. As FIG. 7 illustrates, some implementations of the present disclosure may include one or more entities that are entitled, by the set-up of the network-of-trust, to ban one or more sub-entities from engaging in any transaction and/or interaction with one or more particular entities of the network-of-trust.

Referring back to FIG. 7, an exemplary inventive KYC-tailored distribute ledger/blockchain 702, distributed among the nodes of entities 1, 2 - - - N, stores one or more signatures-of-trust for each sub-entity associated with at least one entity of the network-of-trust. In some embodiments, varies entities of the network-of-trust may employ the same or different KYC procedures to obtain the KYC information for the signatures-of-trust.

Figure 8:
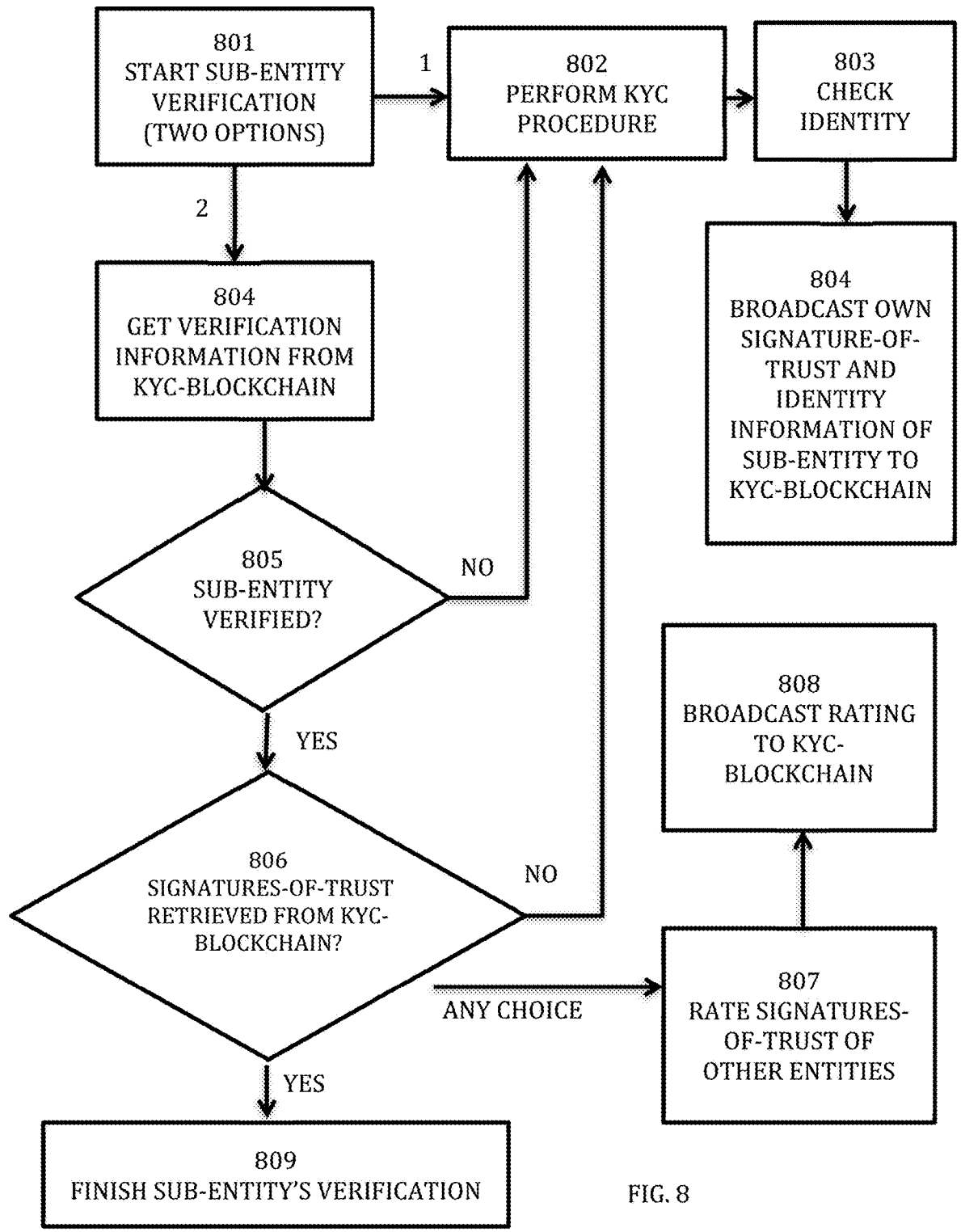

In some embodiments, the exemplary inventive entity-controlled distributed blockchain-type ledger implementation of the present disclosure (e.g., 200) may involve, for example, smart contracts and other programmed routines and data objects that are configured to execute one or more dataflows, rules and/or operations shown in FIG. 8.

In some embodiments, the exemplary inventive KYC-tailored distributed blockchain-type ledger implementations of the present disclosure with associated devices are configured to function without a centralized database (i.e., database residing on one or more computing devices associated with a single entity).

Figure 9:
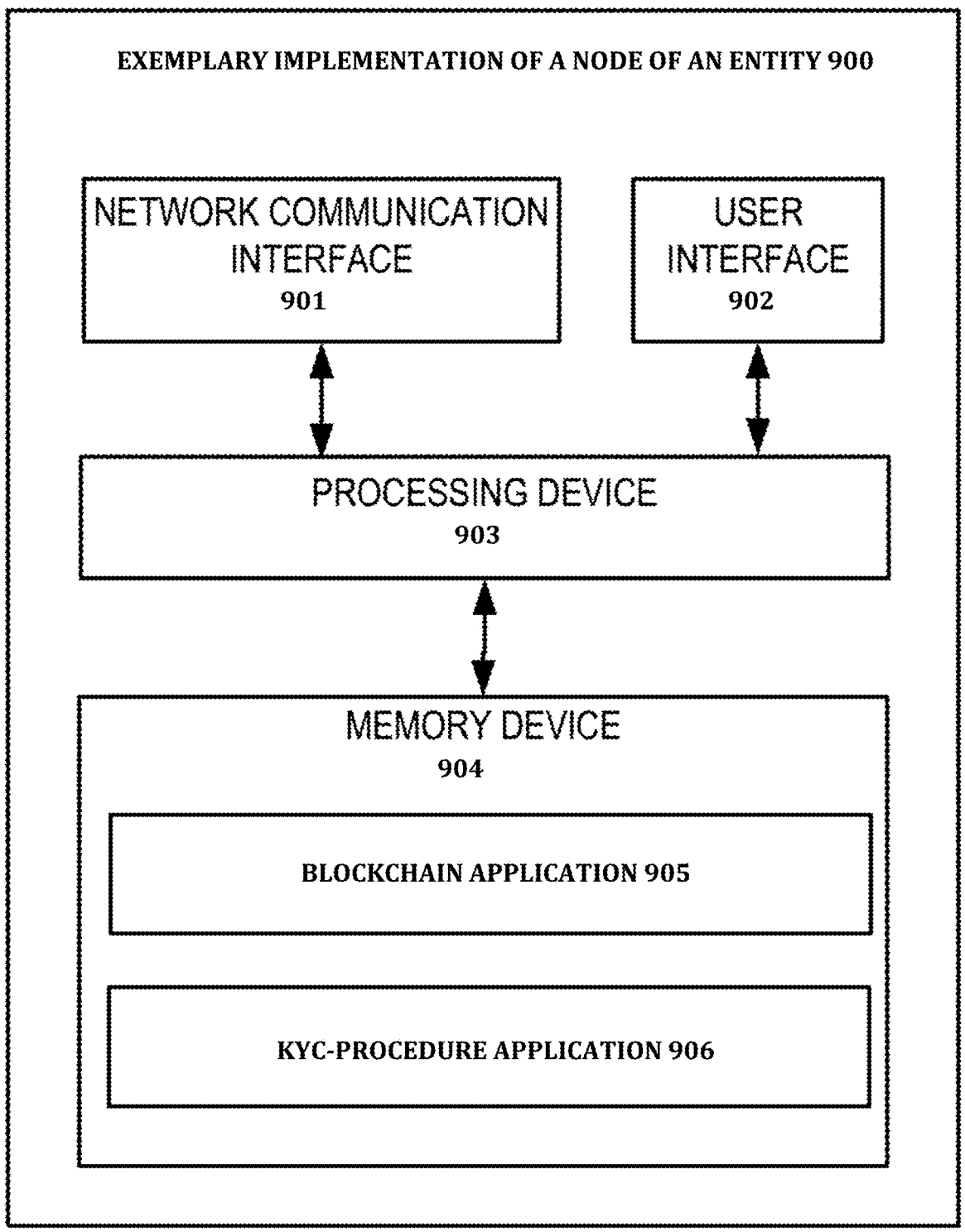

FIG. 9 provides an exemplary architecture of a computing device (node 900) associated with an exemplary entity (e.g., 901). For example, the exemplary computing device (node 900) associated with the exemplary entity (e.g., 901) may execute a blockchain application (905) to receive and/or broadcast sub-entities' signatures-of-trust to and/or from the exemplary KYC-tailored distributed ledger/blockchain and execute a KYC-procedure application (906) to at least one of:
1) obtain and/or confirm the KYC information,
2) generate its own signatures-of-trust, or
3) rate signatures-of-trust of other entity(ies).

Table 2 provides an exemplary code for an exemplary smart contract that contains a field identifying an illustrative signature-of-trust and illustrative KYC methods and that can be invoked, for example, without limitation, by the KYC-procedure application (906).

TABLE 2

```
contract KYC {
    // KYC status value, compressed to uint8
    enum KYC Status {
        unknown, // 0: Initial status when nothing has been done for the address yet
        cleared, /11: Address cleared by KYC entity
        frozen // 2: Address frozen by owner or KYC entity
    }
    // New KYC entity introduced
    event AddedKYCEntity(address addr);
    // KYC entity updated
    event UpdatedKYCEntity(address addr, address indexed by, uint8 rate);
    // KYC entity set account blocked
    event AccountFrozen(address addr, address indexed by);
    // KYC entity set account status cleared
    event AccountCleared(address addr, address indexed by);
    // KYC status map
    mapping(address=>uint8) public addressKYCStatus;
    AddressSet.Data kycEntities;
    function addKYCEntity(address addr) public onlyEntity {
        if(!AddressSet.insert(kycEntities, addr)) {
            throw;
        }
        AddedKYCEntity(addr);
    }
    function getAddressStatus(address addr) public constant returns (uint8) {
        return uint8(addressKYCStatus[addr]);
    }
    function freezeAccount(address addr) public onlyOwnerOrPartner {
        var status = addressKYCStatus[addr];
        if(status == uint8(KYCStatus.frozen)) {
            throw;
        }
        addressKYCStatus[addr] = uint8(KYCStatus.frozen);
        AccountFrozen(addr, msg.sender);
    }
    function clearAccount(address addr) public onlyOwnerOrPartner {
        var status = addressKYCStatus[addr];
```

TABLE 2-continued

```
  if(status == uint8(KYCStatus.cleared)) {
     throw;
  }
  addressKYCStatus[addr] = uint8(KYCStatus.cleared);
  AccountCleared(addr, msg.sender);
}
modifier onlyEntity( ) {
  if(!(AddressSet.contains(kycEntities, msg.sender))) {
     throw;
  }
  _;
 }
}
```

In some embodiments, another example, the computing device(s) associated with the entity(ies) (e.g., via the KYC-procedure application 906 of FIG. 9) may ban or confirm particular sub-entity by analyzing transaction data, automatically rejecting some transactions and assigning some others for manual review while others for additional automatic review, according to a set of rules, automatically accepting some of the reviewed transactions also according to rules. For example, the review rules may accept transactions for the following reasons: Transaction uses prepaid cards and the bank has authorized the transaction; there is a history of the card being used with the consumer account, and there is no history of chargebacks or refunds; the address associated with the consumer's phone number matches the billing address associated with the payment and the consumer responds affirmatively to an automated phone call; the shipping address matches the address associated with the consumer's phone number; there is a positive, non-fraud, match between the physical contact information provided in the transaction and a third-party service; and there is a positive, non-fraud, match between the email contact information provided and the physical contact information for the transaction in a third-party service.

In some embodiments, additional items may include but are not limited to such as a low transaction value, an in-depth KYC analysis has previously been performed on the sub-entity, an element of the transaction is on a whitelist, the transaction is a subscription renewal for a transaction that was previously non-fraudulent, a similar transaction, with the same suspicious characteristics, was previously manually reviewed and accepted by a human reviewer.

In some embodiments, another example, the computing device(s) associated with the entity(ies) (e.g., via the KYC-procedure application 906 of FIG. 9) may be programmed to dynamically/automatically execute one or more KYC-AML procedures and/or invoke one or more routines, dynamically/automatically executing the one or more KYC-AML procedures. Based on the outcome of the execution of the one or more KYC-AML procedures, the exemplary node of the entity can generate signature-of-trust that may indicate that a particular sub-entity is a banned sub-entity (e.g., customer who is suspected in money laundering). For example, the institution's associated node may ban transactions based at least in part on, without limitation, an exemplary KYC procedure that involves user's identity, beneficial ownership of account(s), source of fund(s), past history, online activity(ies), velocity controls on remittance value. etc. For example, an exemplary KYC compliance assessment may be performed at, prior to or after the time a payee is associated with a sending account. In embodiments, the exemplary KYC compliance assessment may involve compliance with and/or assessing compliance with federal, state, local, international and other law, rules and/or regulations. In embodiments, the exemplary KYC compliance assessment may involve reviewing and/or determining volume and/or velocity. In embodiments, the exemplary KYC compliance assessment may involve assessing compliance with volume and/or velocity controls, regulations and the like. For example, volume may include how much money is transferred in a transaction. For example, velocity may include how often money is transferred. In embodiments, the exemplary KYC-AML and/or KYC-anti-fraud compliance assessment may be performed in order to satisfy at least one of the Financial Crimes Enforcement Network, the Office of Foreign Assets Control, a Treasury department or government branch, a labor department or government branch, a justice department of government branch, a federal trade commission and the like. In embodiments, the exemplary KYC-AML and/or KYC-anti-fraud compliance assessment may be performed in order to assess compliance with at least one of AML acts and/or regulations. In some embodiments, for example, at a set interval (such as at least once per day), the computing device(s) associated with the one or more entity(ies) (e.g., via the KYC-procedure application 906 of FIG. 9) may interface with, for example, the US Financial Crimes Enforcement Network (FinCEN) database and/or similar electronic sources to download the current list of persons that would trigger a suspicious activity report.

In some embodiments, the exemplary inventive KYC-tailored distributed blockchain-type ledger implementations of the present disclosure may be configured to filter transactions based on transaction value and type of goods prior to acceptance rules. In some embodiments, the exemplary inventive KYC-tailored distributed blockchain-type ledger implementations of the present disclosure may a) compare and/or rate: 1) signatures-of-trust of the exemplary sub-entity submitted by various entities of the network-of-trust and/or 2) own signature-of-trust of the exemplary sub-entity with one or more signatures-of-trust of the exemplary sub-entity submitted by other entities, and b) then accept or reject a particular transaction based at least in part on the comparison and/or rating.

In some embodiments, additional items may include but are not limited to such as a low transaction value, an in-depth KYC analysis has previously been performed on the user, an element of the transaction is on a whitelist, the transaction is a subscription renewal for a transaction that was previously non-fraudulent, a similar transaction, with the same suspicious characteristics, was previously manually reviewed and accepted by a human reviewer.

In some embodiments, the exemplary inventive KYC-tailored distributed blockchain-type ledger implementations of the present disclosure with associated devices represent technological solutions that, for example, without limitation, reduce volume of data being transacted over the exemplary KYC-tailored distribute ledger/blockchain. In some embodiments, the exemplary inventive KYC-tailored distributed blockchain-type ledger implementations of the present disclosure with associated devices represent technological solutions that, for example, without limitation, reduce amount of processing power that, for example, computing devices of associated entities would otherwise need to use to administer their own KYC procedures.

Illustrative Examples of Computer Systems Implementing Blockchain-Based Hybrid Digital Instrument Exchanges and Methods of Use Thereof In the exemplary embodiments, settlement of trades is decentralized, while the order book is centralized, i.e. controlled by the electronic exchange. In some embodiments of a hybrid exchange, the procedure of trades includes the following steps. The customers allocate amounts (deposits) for trading purposes. These deposits are blocked until all the parties sign electronically their agreement to use them. For example, a user A wishes to sell coins X to a user B for coins Y. In the hybrid exchange approach, the desired amount of coins X is blocked, the exchange sets the price at which the trade will be executed, all parties (users A, B and exchange) sign electronically their agreement to execute the trade, then the trade is executed. More complicated schemes may involve more participants.

Figure 10:
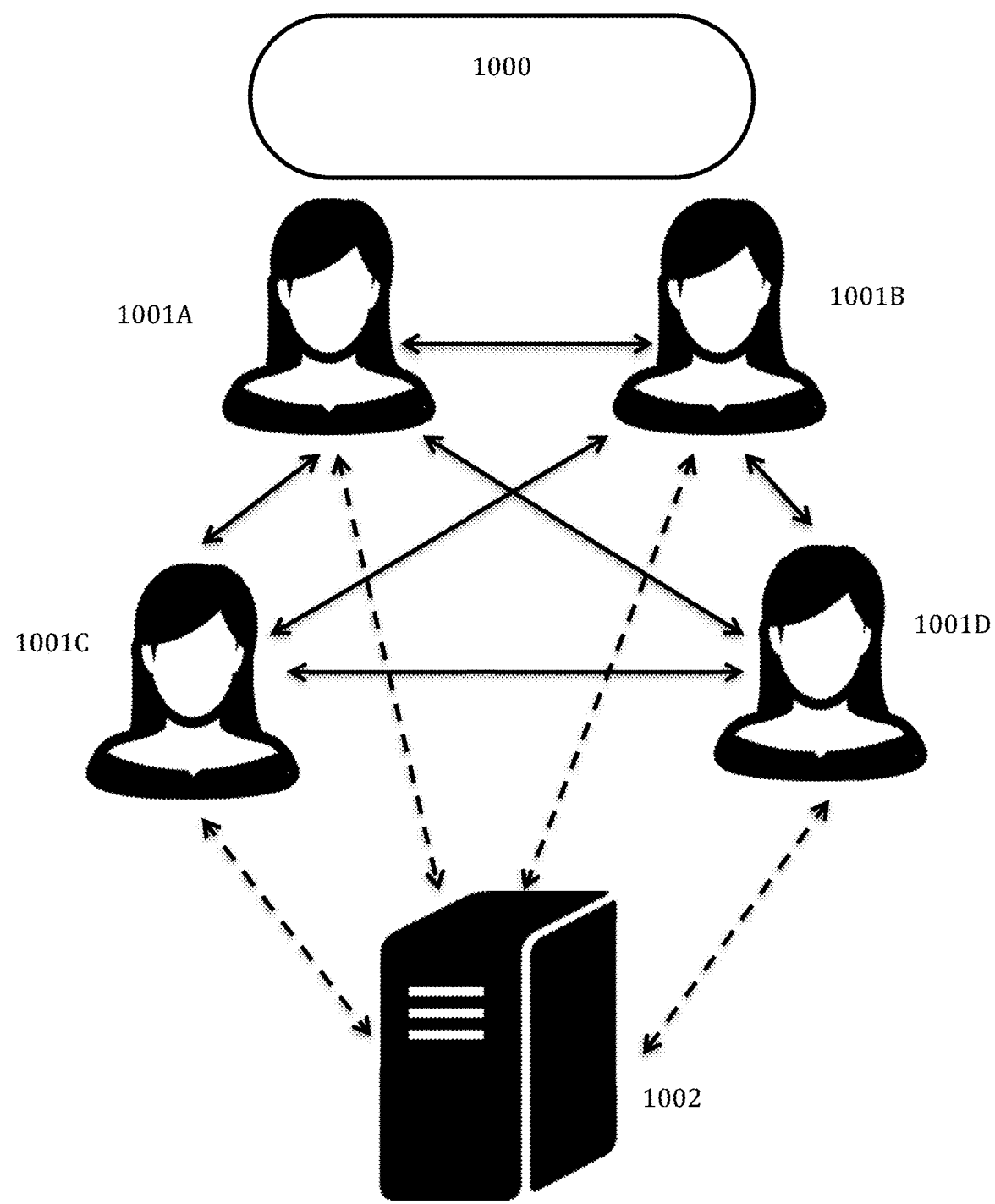

FIG. 10 shows the architecture of an exemplary inventive hybrid digital currency exchange 1000. In some embodiments, the users 1001 communicate to each other by means of a peer-to-peer network, set and perform transactions. In some embodiments, a digital currency exchange system 1002 controls the order book and communicates with the users 1001 in order to perform transactions (e.g., trades).

Figure 11:
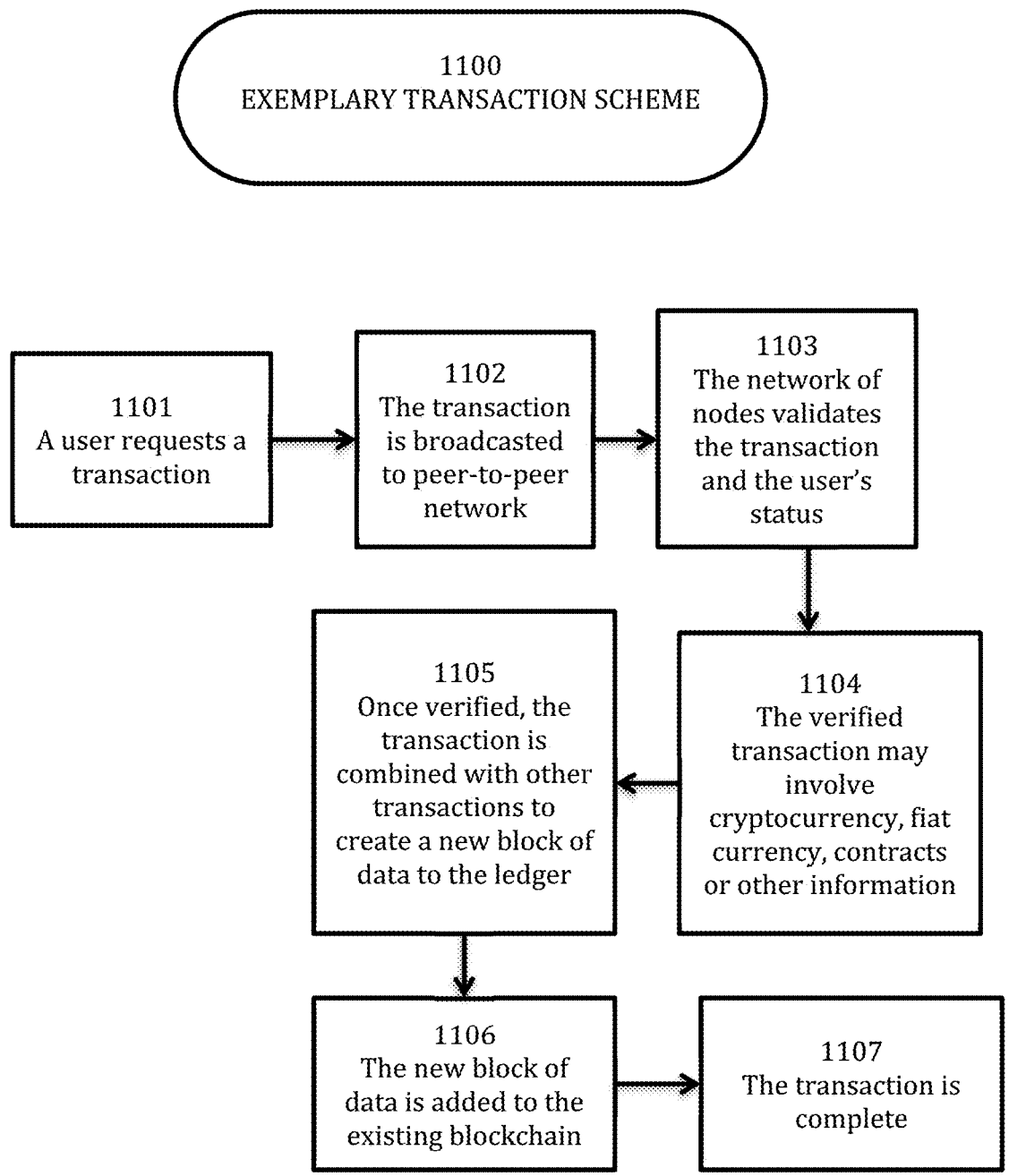

FIG. 11 shows an exemplary method 1100 by which transactions may be processed by the exemplary hybrid digital currency exchange 1000. In step 1101, one of the users 1101 requests a transaction. In step 1102, the transaction request is broadcasted to the peer-to-peer network. In step 1103, the peer-to-peer network validates the transaction and the user's status. In step 1104, the transaction is verified by the peer-to-peer network; in some embodiments, the transaction involves cryptocurrency, fiat currency, a contract, or other information. In step 1105, after having been verified, the transaction is combined with other transactions to create a new block of data for the ledger. In step 1106, the new block of data is added to the existing blockchain. In step 1107, the transaction and the method 1100 are complete.

Figure 12:
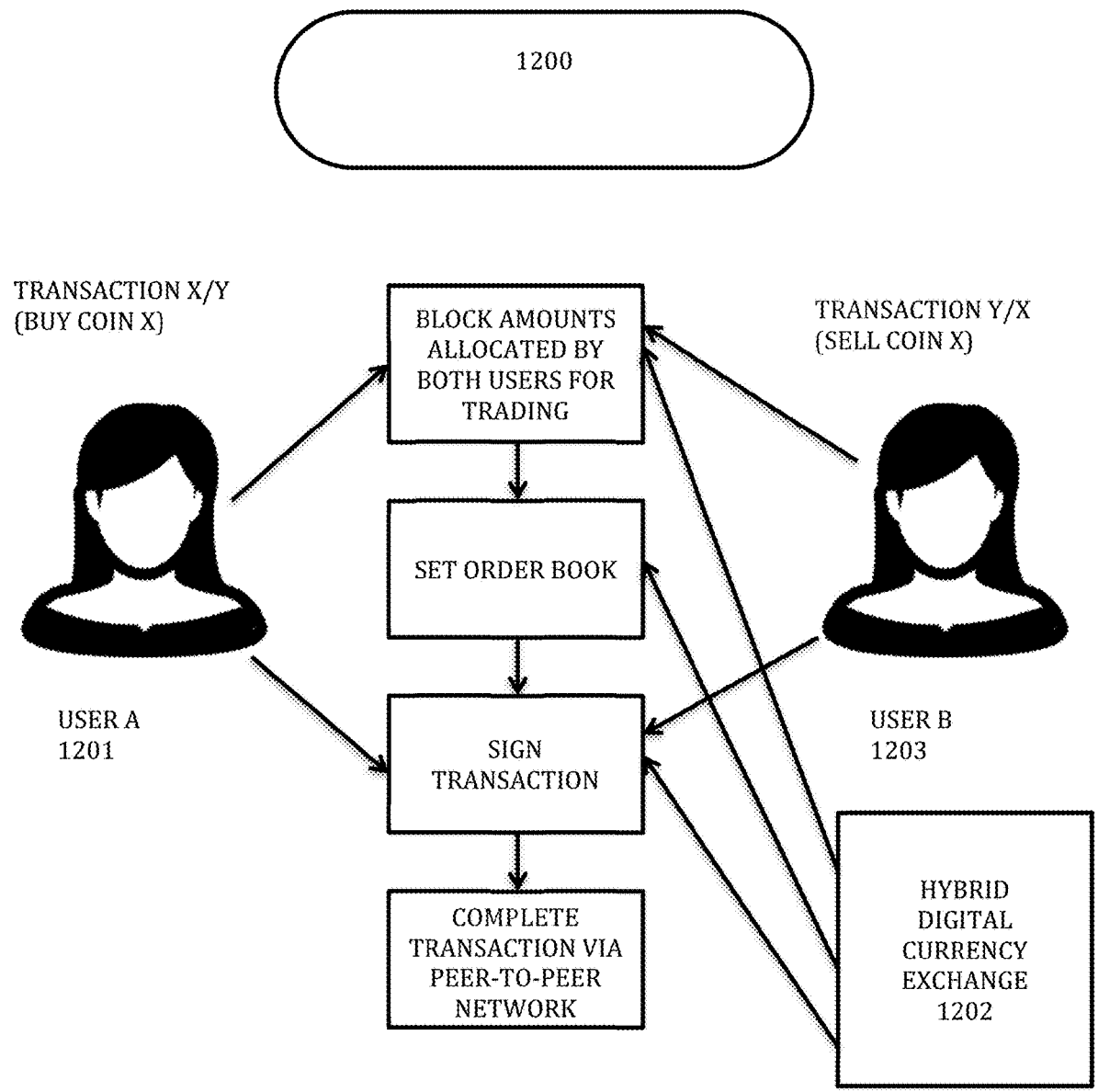

FIG. 12 shows an exemplary process 1200 from the point of view of the exemplary hybrid digital currency exchange 1202. As shown in FIG. 12, the user A, 1201, wants to perform a transaction for digital currency pair X/Y (i.e., wants to buy coin X), and the user B, 1203, does the same for the digital currency Y/X (i.e., wants to sell coin X). The digital currency exchange system 1202 blocks amounts allocated by both users, matches users to each other, and sets the price (e.g., the system sets the order book by matching all available users). Then, all the parties (i.e., the user A, user B, and exchange system 1202) sign the agreement to perform a transaction and the transaction is completed via the peer-to-peer network.

Figure 13:
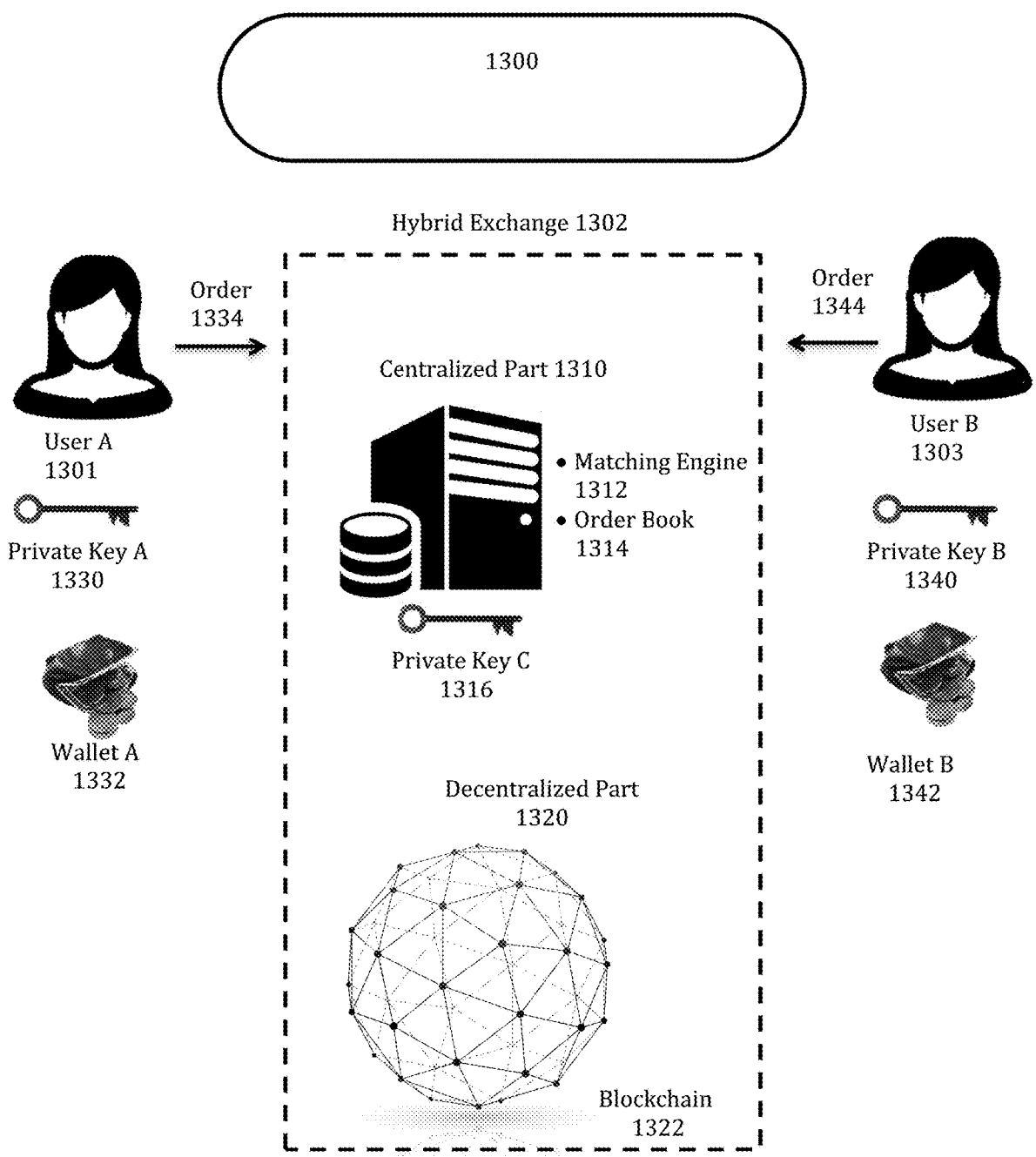

FIG. 13 shows an exemplary implementation scheme 1300 of the exemplary hybrid digital currency exchange 1302. In some embodiments, the exemplary hybrid digital currency exchange 1302 includes a centralized portion 1310 and a decentralized portion 1320. In some embodiments, the centralized portion 1310 includes a matching engine 1312, the operation of which will be described hereinafter. In some embodiments, the matching engine 1312 may be configured to process limit orders. In some embodiments, the matching engine 1312 may be configured to process market orders. In some embodiments, the centralized portion 1310 includes an order book 1314 including records of orders processed by the exemplary hybrid digital currency exchange 1302. In some embodiments, the centralized portion 1310 includes a private key 1316. In some embodiments, the decentralized portion 1320 includes a blockchain 1322. In some embodiments, the user A, 1301, has a private key 1330 and a wallet 1332 storing, for example, but not limited to, a digital currency. In some embodiments, the user B, 1303, has a private key 1340 and a wallet 1342 storing, for example, but not limited to, a digital currency. In some embodiments, the user A sends an order 1334 to the hybrid digital currency exchange 1302 and the user B sends an order 1344 to the hybrid digital currency exchange 1302 to initiate a transaction.

Figure 14:
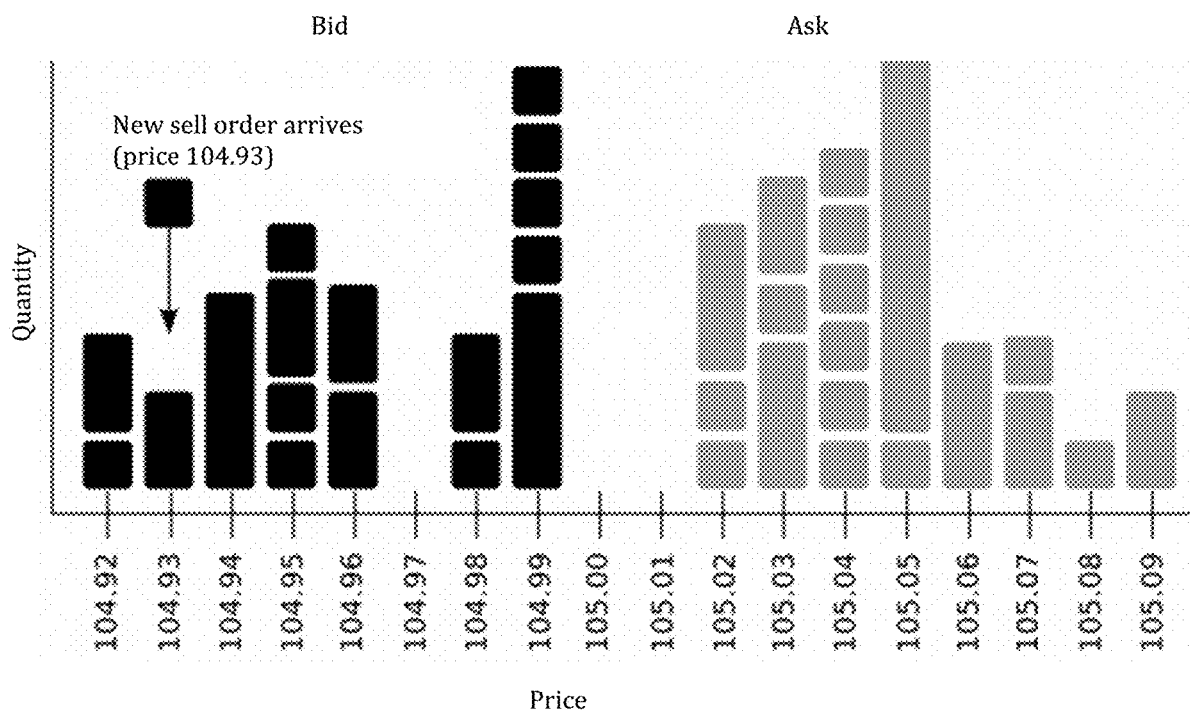

FIG. 14 shows an exemplary scheme 1400 of an order matching book that the matching engine 1312 is configured to administer to match limit orders.

Figure 15:
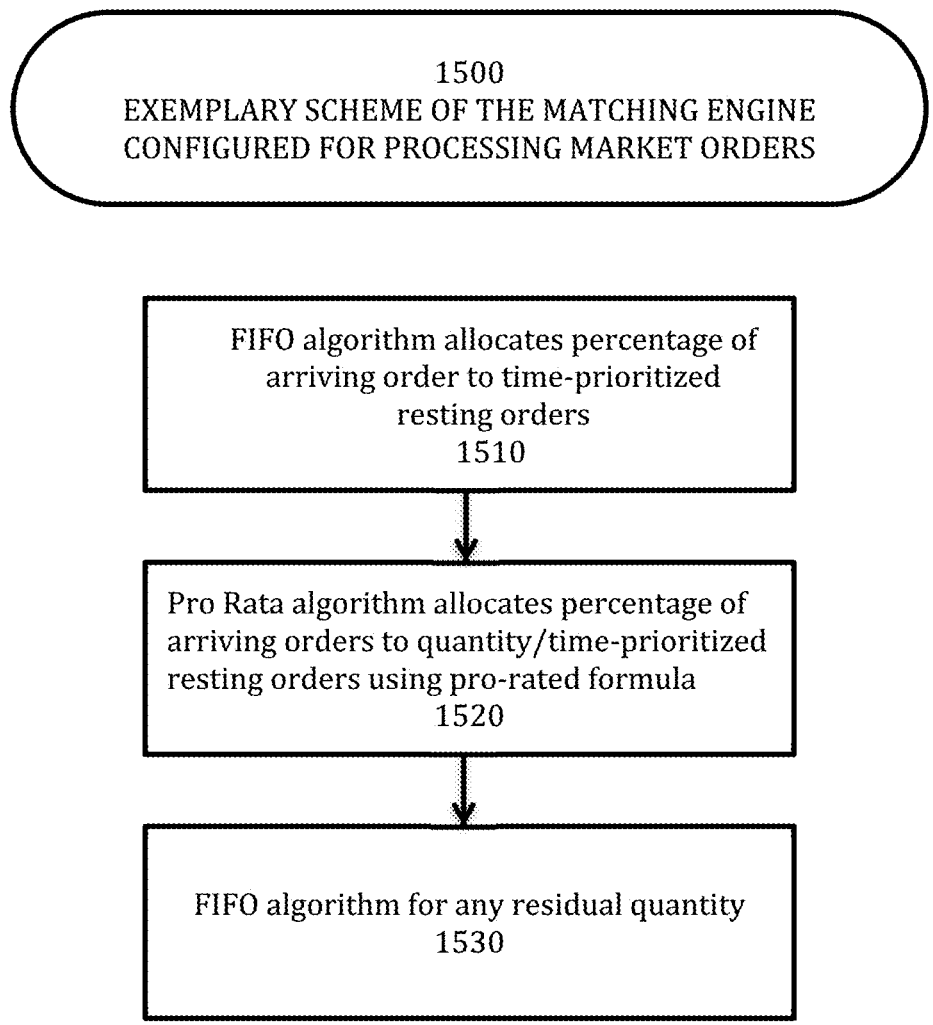

FIG. 15 shows an exemplary scheme 1500 of the matching engine 1312 as configured to process market orders. In step 1510, a FIFO (first-in first-out) algorithm allocates a percentage (for example, without limitation, which may be all) of an arriving order to time-prioritized resting orders. In step 1520, a pro-rata algorithm allocates a percentage (which may be all) of arriving orders to quantity-prioritized/time-prioritized resting orders using a pro-rated formula. In step 1530, the FIFO algorithm is used to allocate any residual quantity of an arriving order.

In various embodiments, the above-described matching algorithm may be implemented in many different ways. In some embodiments, two major features of the algorithm are (1) split percentage allocations and (2) pro rata leveling allocation. In various embodiments, a certain percentage of each matching order gets allocated first-in-first-out (FIFO) and the remainder is allocated pro rata, with additional rules due to rounding after the pro rata allocation. In some embodiments, the percentage of matching orders that is allocated by FIFO is between 5% and 15%, or between 15% and 25%, or between 25% and 35%, or between 35% and 45%, or between 45% and 55%, or between 55% and 65%, or between 65% and 75%, or between 75% and 85%, or between 5% and 50%, or between 25% and 75%, or between 0% and 20%, or between 20% and 40%, or between 40% and 60%, or between 60% and 80%, or between 80% and 100%, or between 0% and 40%, or between 20% and 60%, or between 40% and 80%, or between 60% and 100%. One such rule is the pro rata leveling allocation, which can be viewed as a sub-allocation within the algorithm. In some embodiments, after the pro rata allocation, any orders that did not receive a pro rata fill are eligible for a one lot fill, with priority based on size and/or time in the case of multiple eligible orders for the same size.

The following example shows a soybean futures order matching process. In the example, an order book is as follows:
Order Book
Soybeans (ZS)
(Top Priority) Sell 10 Limit @ 1009.6
Sell 55 Limit @ 1009.6
Sell 10 Limit @ 1009.6
Sell 65 Limit @ 1009.6
Sell 85 Limit @ 1009.6
Total: 225 Contracts Offered
Incoming Buy 30 Limit @ 1009.6.

In this example, the contract has a Top Order allocation of 100% up to 100 contracts. Consequently, the Top Order of 10 contracts is filled completely, and 20 contracts (i.e., the 30 contracts in the incoming buy, less the Top Order of 10) remain to be matched. The 40% FIFO pass begins with 20 contracts remaining to be matched, and as a result 8 contracts (i.e., 40% of 20) are matched to the top FIFO order remaining (i.e., the Sell 55 Limit @ 1009.6 offer), reducing its size on the order book to 47. The Pro Rata phase of the order match has 12 contracts remaining to be allocated (i.e., the 20 contracts remaining after the Top Order phase, less 8 contracts allocated in the FIFO pass) and 207 contracts offered (i.e., the original total of 225 contracts offered, less the 18 contracts that were matched in the first two phases).

Due to rounding down, 9 contracts are filled Pro Rata (i.e., 4 contracts matched to the Sell 85 offer based on 85/207*12=4.93, rounded down to 4; 3 contracts matched to the Sell 65 offer based on 65/207*12=3.77, rounded down to 3; 2 contracts matched to the Sell 47 offer, originally the Sell 55 offer, based on 47/207*12=2.72, rounded down to 2), and the resting order for 10 contracts receives a 1 lot Leveling fill since it did not participate in (i.e., have any contracts filled during) the Pro Rata phase. The final 2 contracts are then allocated on a FIFO basis (i.e., to the offer that was originally the Sell 55 offer). This example illustrates how the combined algorithm offers opportunities for resting orders to be matched both on a size and speed basis, as well as the opportunity for passive fills in the leveling stage that market participants may be overlooking. In various embodiments, other matching algorithms (e.g., FIFO, Lead Market Maker, Pro Rata, etc.) or a combination thereof may also be used.

Table 3 shows sample code implementing an exemplary smart contract that may be executed by the exemplary hybrid digital currency exchange 1000. It will be apparent to those of skill in the art that the sample code provided in Table 3 contains definitions of variables, classes, functions, etc., rather than a full working implementation.

TABLE 3

```
#Smart Contract describing the collection of data elements
necessary for UserA, UserB and Exchange.
contract Trade is mortal{
    mapping (address=>UserA) public UsersA
    mapping (address=>UserB) public UsersB
    mapping (address=>Exchange) public Exchanges
    struct UserA {
        bool UserAActive;
        uint UserALastUpdate;
        string UserAName;
        string UserAAddress;
        address UserAAccount1;
        address UserAAccount2;
    }
    struct UserB {
        bool UserBActive;
        uint UserBLastUpdate;
        string UserBName;
        string UserBAddress;
        address UserBAccount1;
        address UserBAccount2;
    }
    struct Exchange {
        bool ExchangeActive;
        uint ExchangeLastUpdate;
        address ExchangeAddress;
        string ExchangeName;
    }
    struct Transaction {
        string UserA;
        string UserB;
        string Exchange;
        uint32 AmountA;
        uint32 AmountB;
        uint32 Rate;
        string ReferenceMessage;
        bool UserAAgrees;
        bool UserBAgrees;
        bool ExchangeAgrees;
    }
    function SetUserA (string _UserAname, string _User-
Aaddress, address _UserAaccount1, address _UserAaccount2 ) {
        UserAName = _UserAname ;
        UserAAddress = _UserAaddress;
        UserAAccount1 = _UserAaccount1;
        UserAAccount2 = _UserAAccount2;
    }
    function SetUserB (string _UserBname, string _User-
Baddress, address _UserBaccount1,address _UserBaccount2 ) {
        UserBName = _UserBname;
```

TABLE 3-continued

```
        UserBAddress = _UserBAddress;
        UserBAccount1 = _UserBaccount1;
        UserBAccount12= _UserBaccount2;
    }
    function SetAmounts (uint32 _amountA, uint32 _amountB){
        AmountA = _amountA;
        AmountB = _amountB;
    }
    function SetRate (uint32 _rate){
        Rate = _rate;
    }
}
contract mortal {
    address public owner;
    function mortal( ) {
        owner = msg.sender;
    }
    modifier onlyOwner {
        if (msg.sender != owner) {
            throw;
        } else {
            -
        }
    }
    function kill( ) onlyOwner{
        suicide(owner);
    }
}
```

In some embodiments, the exemplary hybrid digital currency exchange 1302 provides a high level of security. In some embodiments, the exemplary hybrid digital currency exchange is difficult to hack. In some embodiments, the exemplary hybrid digital currency exchange is difficult to hack as compared to a standard exchange because all transactions are performed in a distributed network and all funds are stored in a distributed manner (e.g., each participant owns its own funds). In some embodiments, the exemplary hybrid digital currency exchange requires decreased hardware resources as compared to a standard exchange because fewer servers are required as transactions take place in the blockchain.

In some embodiments, once two of the users have agreed to and triggered a smart contract, execution of the smart contract may occur automatically. In some embodiments, execution of the smart contract may be triggered upon payment of some amount of a cryptocurrency. In some embodiments, a party who sells cryptocurrency triggers execution of a smart contract. In some embodiments, an exchange triggers execution of a smart contract by paying for the execution. In either of the two cases noted above, paying cryptocurrency means triggering the smart contract.

In some embodiments, the exemplary hybrid digital currency exchange 1302 generates a smart contract that resides on the blockchain. In some embodiments, the exemplary smart contract then interacts with all three parties (e.g., the two users involved in the smart contract and the exchange) to execute the contract. In some embodiments, a smart contract relates to real estate. In some embodiments, a smart contract relates to a computer program with any content executed in the blockchain. In some embodiments, the exemplary hybrid digital currency exchange 1302 may generate a smart contract in the following way. A first user A pays cryptocurrency for some asset provided by a second user B at a price set by an exchange C (e.g., by matching orders of the first user A and the second user B). The contract is executed when all conditions are met: the amounts of funds provided by both users are sufficient, the price is correct (i.e. those signed by all parties), etc. If, following the provided example, the exchange is hacked and the price is modified, the first user A will be refunded with their cryptocurrency and the second user B's asset (e.g., fiat currency) will be unblocked and returned to their own electronic (or some other) account. In some embodiments, parties' identities are not disclosed one another, and only the digital signatures of the parties and the exchanges are involved.

Illustrative Examples Improved Digital Wallets and Methods of Used Thereof

As used herein, the terms "digital wallet," "mobile wallets," and "electronic wallet" (collectively, "eWallet") refers to an electronic device (e.g., a computing device, memory storage device, a memory storage computing device, etc.), an electronic service software, or a combination of the hardware and service/software that facilitate an entity (e.g., individual, company) to make electronic transactions (e.g., purchasing items on-line with a computer, using a smartphone to purchase something at a store, etc.). For example, an entity's bank account can also be linked to the eWallet. For example, eWallet may also store user's driver's license, health card, loyalty card(s), and/or other ID documents. For example, the exemplary eWallet may be configured to causes the entity's credentials to pass to a merchant's terminal wirelessly via, for example, without limitation, near field communication (NFC). For example, the exemplary eWallet may be configured to also authenticate the holder's credentials. For example, the exemplary eWallet could verify the age of the buyer to the store while purchasing alcohol. For example, the exemplary eWallet could store private keys for cryptocurrencies (e.g., Bitcoin, Ether, Ripple, etc.).

In some embodiments, the exemplary eWallets of the present disclosure with associated devices are configured to affect transactions involving cryptocurrencies into one another and also into (or between) so-called FIAT money or FIAT currency and vice versa.

In some embodiments, the exemplary inventive eWallets of the present disclosure with associated devices are configured to operate within exemplary distributed blockchain-type ledger implementations of the present disclosure which may be configured to operate in geographically distributed database form (e.g., a blockchain, Ethereum environment, etc.). In some embodiments, the exemplary inventive eWallets of the present disclosure with associated devices are configured to ensure the integrity of data by cryptographic hashing the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (e.g., the exemplary blockchain) may be distributed among multiple network nodes (e.g., running one or more servers administering the exemplary blockchain) within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. Typically, a central trust authority is therefore not required to vouch for the integrity of the distributed database hosted by multiple nodes in the network. In some embodiments, the exemplary inventive eWallets of the present disclosure with associated devices are configured to incorporate and/or interact with at least one smart contracts-based administrative layer that may include one or more smart contracts that are computer processes that facilitate, verify and/or enforce negotiation and/or performance of one or more particular activities among entities (e.g., users/parties). For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and *Byzantine* fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the exemplary inventive eWallets of the present disclosure with associated devices are designed to issue and/or perform exchange transactions with tokens whose value is kept fixed against that of the real assets (stocks, bonds, futures, commodities, indices, currencies, etc.). In some embodiments, the exemplary inventive eWallets of the present disclosure with associated devices are configured to participate in transactions one or more DECSPs.

In some embodiments, the exemplary inventive eWallets of the present disclosure with associated devices may operate within an exemplary blockchain, as shown in FIG. 2, that may include nodes 201 (where each node 201 represents one or more computing devices) that manage a blockchain ledger (202).

In some embodiments, the exemplary inventive eWallets of the present disclosure with associated devices are configured such that users may not access (e.g., ability to withdraw) their tokens. For example, the exemplary inventive eWallet may be configured to cause to generate a graphical user interface (GUI) (e.g., a web interface, specific computer, and/or mobile-device application (with the own electronic address)) that shows a number of owned tokens and allow the user an ability to manipulate (e.g., sell) the tokens (all or some quantity) back to a token issuer and/or another designated party.

In some embodiments, the exemplary inventive eWallets of the present disclosure with associated devices are configured such that the inventive eWallets keeps all private keys for the user.

In some embodiments, the exemplary inventive eWallets of the present disclosure with associated devices may participate in issuance of tokens based, at list in part, on an exemplary methodology of the User-Issued Assets of the Bitshares (https://bitshares.org, BitShares Blockchain Foundation, Slovenia) which are custom tokens registered on the Bitshares platform. For example, a user-issuer of such a User-Issued asset may publicly name, describe, and distributes such tokens, and can specify customized requirements, such as an approved whitelist of accounts permitted to hold the tokens, or the associated trading and transfer fees. For example, in some embodiments, the exemplary inventive eWallets of the present disclosure with associated devices may be configured to utilize, at least in part of their operation, software routine(s) such as, without limitation, from Bitshares' github routine library to issue the asset-linked tokens of the present disclosure.

For example, in some embodiments, the exemplary inventive eWallets of the present disclosure with associated devices may participate in issuance of tokens based, at list in part, on software routine(s) such as exemplary methodology of the ERC20 contract of the Ethereum blockchain (Solidity), as, for example, without limitation. For example, the issuance of tokens of the present disclosure based, at least in part, on the Ethereum methodology, may be configured to store tokens' prices in the Ethereum blockchain. In some embodiments, the exemplary inventive eWallets of the present disclosure with associated devices may be configured to, at least, without limitation, convert data string to a hexadecimal form using a suitable converter, and then, use the resulted hexadecimal number in the data field, for example, in the Solidity code (contract-oriented programming language for writing smart contracts) by starting the string with "0x". An illustrative, non-limiting example of such string is 0x537461636b45786368616e6765.

For example, in some embodiments, the exemplary inventive eWallets of the present disclosure with associated devices, utilizing an exemplary Ethereum-based blockchain, may be configured to store transactions as signed data packages of messages to be sent from one account to another account on the blockchain. For example, an illustrative transaction may contain identification of a recipient of the message; a signature identifying the sender (proving the intention to send the message via the blockchain to the recipient); a "VALUE" field (e.g., identifying an amount of wei to transfer from the sender to the recipient (e.g., 10^18 Wei=1 Ether); a data field (which can contain the message sent to a smart contract); a startGAS value (which represents a maximum number of computational steps the transaction execution is allowed to take (metering unit of Ethereum Virtual Machine (EVM) or the World Computer; and a GASprice value (which represents the fee the sender is willing to pay for gas (for example, one unit of gas may corresponds to the execution of one atomic instruction (a computational step) (e.g., for example, a multiplication (MUL) consumes 5 gas and an addition (ADD) consumes 3 gas).

Figure 6A:
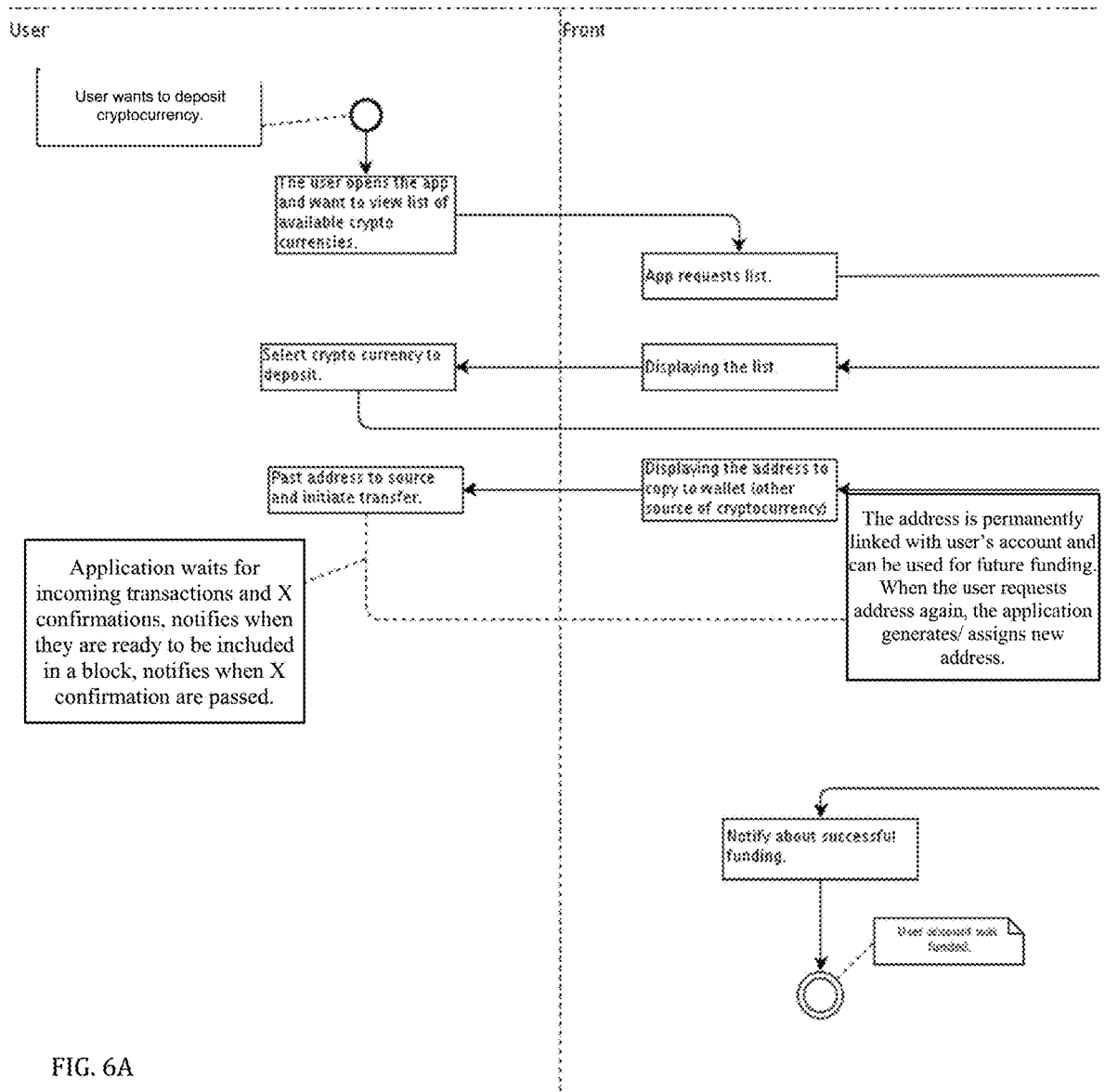
Figure 6B:
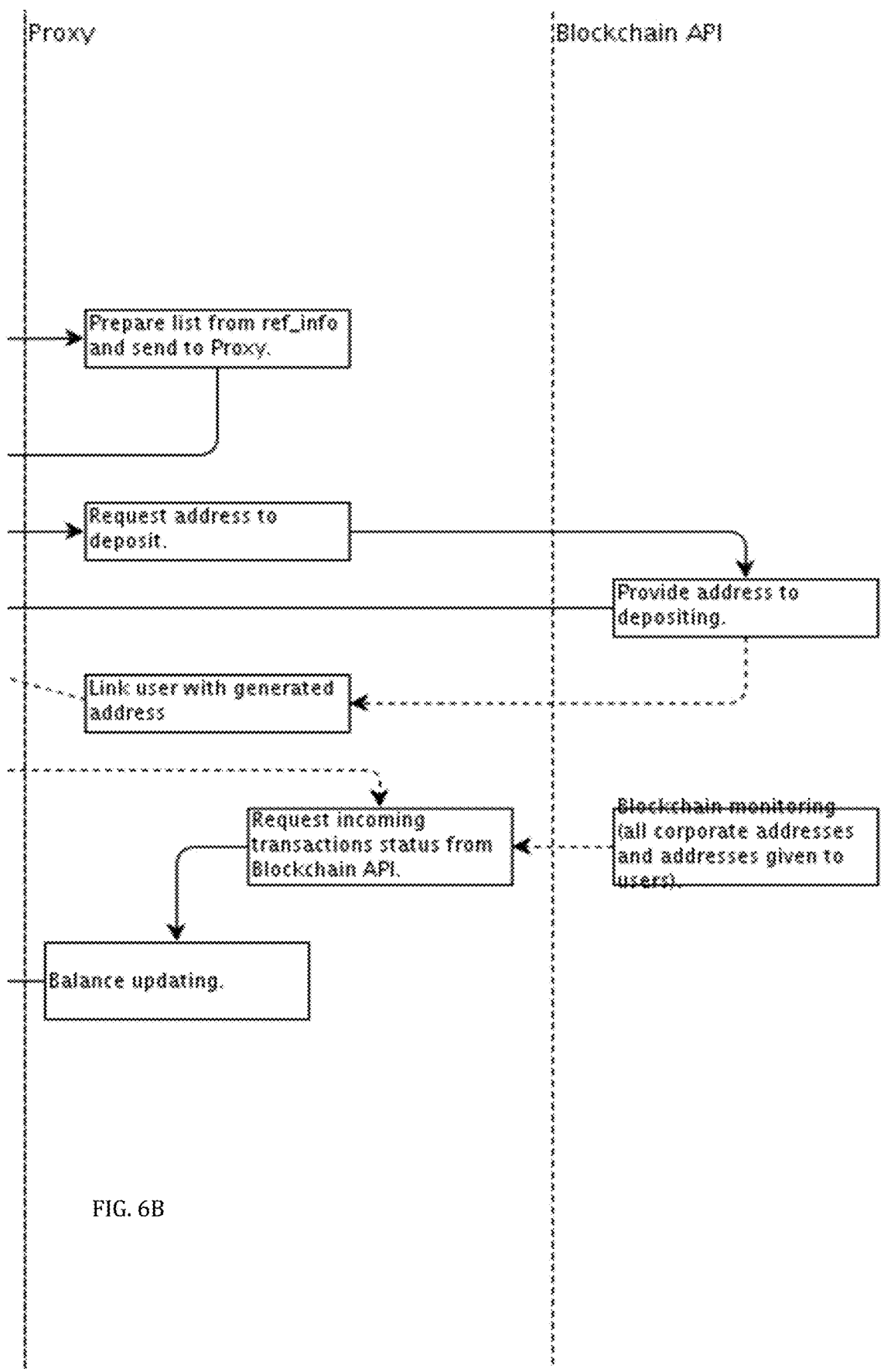

For example, as shown in FIG. 5, in some embodiments, the exemplary inventive eWallets of the present disclosure with associated devices allow the user to deposit digital currency to the eWallets (e.g., buying a token) in a manner shown by the data flows 1 and 2 in FIG. 5 (see also FIGS. 6A and 6B). The withdrawal process is illustrated by the data flow 3. The user is provided a memory address of his/her eWallet application (3.1) via one or more ways (3.2) (e.g., via scanning QR code, inserting a number, or manually entry by the user). In some embodiments, the exemplary inventive eWallets of the present disclosure with associated devices are configured to communicate the proposed transaction through the Proxy and Blockchain API units to the exemplary blockchain (3.3-3.7). In some embodiments, the exemplary Blockchain API returns a response (3.8) on the status of the transaction (e.g., pending, confirmed, or failed). For example, when the transaction status becomes successful, the Proxy unit may be configured to send a confirmation (3.9) to the exemplary inventive eWallets of the present disclosure.

In some embodiments, the exemplary Proxy unit may be operationally connected to the exemplary Database #1 where the data related to the user's interaction with the exemplary inventive eWallet is stored (e.g., information about user's account(s) and activity (e.g., transactions, addressed, balances)).

In some embodiments, the exemplary Database #2 may store the exemplary inventive eWallets, addresses, transactions, etc. For example, the exemplary Blockchain API unit (hardware and software), without limitation, is configured to at least perform operations with the exemplary inventive eWallets and digital currency addresses such as, without limitation, obtaining new addresses for depositing digital currencies by users, initializing transactions, providing currency flows between "hot" and "cold" eWallets (for example, the hot eWallets may be the exemplary inventive eWallets and be part of, for example a crypto-exchange, although they may be "logically" structured as being signed to users; the cold eWallets may physically belong to users, (e.g., separate devices (e.g., USB, smart phone) and/or software).

In some embodiments, the exemplary Proxy unit is in the form of a hub (hardware and software) which, for example, without limitation, is configured to at least maintain users' accounts, control the balance and status information, etc.

In some embodiments, the illustrative flowchart of FIGS. 6A and 6B may be also utilized to deposit digital asset via the improve eWallets of the present disclosure. For example, when a user wants to deposit digital currency (e.g., buy tokens) into an exemplary inventive eWallet, the exemplary implementation of the present disclosure may be configured to provide the list of available digital currencies (e.g., users open the application and request the list). For example, the exemplary implementation of the present disclosure may be configured to send a request to the exemplary Proxy unit, which retrieves the list from the Database (e.g., FIG. 16) and sends the list back to the application interface. For example, the exemplary implementation of the present disclosure may be configured to display the list of available digital currencies to the user. When the exemplary implementation of the present disclosure receives the user's selection of desirable digital currency, the Proxy unit may request address to which the selected digital assets will be deposited provided by the exemplary Blockchain API. For example, the exemplary Blockchain API may permanently link the user's digital presence with the generated address which may be also used for the next funding. For example, in some embodiments, if the user requests a new address (e.g., the user wishes to buy a token having zero balance of that token), the new one will be generated. For example, the exemplary Blockchain API may be configured to send the memory address to the exemplary implementation of the present disclosure allowing the user to initiate the transfer. For example, the exemplary implementation of the present disclosure may be programmed to notify the user when the transaction is added to the block of the exemplary blockchain/ledger. For example, upon receiving a request from the user, the exemplary Proxy unit may be configured to request the transaction's status from the exemplary Blockchain API (e.g., the exemplary blockchain of the present disclosure may be configured to monitor all corporate addresses and addresses assigned to users). For example, the exemplary implementation of the present disclosure may be further programmed to update the user's balance and notify the user about the successful funding.

In some embodiments, the exemplary inventive eWallets of the present disclosure with associated devices represent technological solutions that, for example, without limitation, reduce volume of data being transacted over distribute ledgers/blockchains. For example, in some embodiments, the exemplary inventive eWallets of the present disclosure with associated devices represent technological solutions that, for example, without limitation, reduce amount of processing power. For example, given that the number of issued tokens may be rather large (e.g., 10, 100, 1000, 2000, or more), the exemplary inventive eWallets of the present disclosure provide safety in storing digital assets and controlling flows between each other eWallet and other types of eWallets (e.g., traditional cold and hot eWallets). For example, in some embodiments, the exemplary inventive eWallets of the present disclosure with associated devices may be configured to allow users to buy/sell/trade tokens that represent real assets in digitized form combining benefits of both types.

In some embodiments, the exemplary inventive eWallets of the present disclosure may be designed to operate on a Bitcoin-based platform as represented by the illustrative software code detailed in Appendix A.

In some embodiments, the exemplary inventive eWallets of the present disclosure may be designed to operate on a Ethereum-based platform as represented by the illustrative software code detailed in Appendix B.

At least some aspects of the present disclosure will now be described with reference to the following numbered clauses.

Clause 1. A computer-based system comprising:
a dual-exchange cryptographically-secured platform (DECSP);
wherein the DECSP comprises:
1) a first-type cryptographically-secured platform (first-type CSP) and
2) a second-type cryptographically-secured platform (second-type CSP); wherein the first-type CSP comprises at least one first computing device; wherein the second-type CSP comprises at least one second computing device
wherein the at least one first computing device is operationally connected to a blockchain and configured to at least:
i) issue at least one digital cryptographical token (crypto-token) associated with at least one non-crypto asset,
ii) perform at least one blockchain-based activity with the at least one crypto-token,
iii) automatically cause to cryptographically generate, on a blockchain, at least one first blockchain immutable record of the at least one blockchain-based activity with the at least one crypto-token, and
iv) automatically transmit at least one instruction associated with the at least one non-crypto asset to the at least one second computing device of the second-type CSP in response to an issuance of the at least one crypto-token by the at least one first computing device of the first-type CSP;
wherein the at least one second computing device of the second-type CSP is configured to at least:
i) receive the at least one instruction associated with the at least one non-crypto asset from the at least one first computing device of the first-type CSP and
ii) automatically communicate with at least one non-crypto asset electronic marketplace to execute at least one transaction associated with the at least one non-crypto asset based on the at least one instruction to obtain at least one position in the at least one non-crypto asset; and wherein the at least one first computing device of the first-type CSP, the at least one second computing device of the second-type CSP, or both, are configured to automatically link:
i) the at least one blockchain-based activity with the at least one crypto-token and
2) the at least one position in the at least one non-crypto asset.

Clause 2. The system of Clause 1, wherein the at least one first computing device of the first-type CSP, the at least one second computing device of the second-type CSP, or both, comprise a non-transitory computer memory storing computer code that, when executed, causes the at least one first computing device of the first-type CSP, the at least one second computing device of the second-type CSP, or both, to automatically execute at least one know-your-customer (KYC) determination.

Clause 3. The system of Clauses 1-2, wherein the at least one first computing device of the first-type CSP is further configured to automatically cause to cryptographically generate, on the blockchain, at least one second blockchain immutable record of the at least one position in the at least one non-crypto asset that is cryptographically linked to the at least one crypto-token.

Clause 4. The system of Clauses 1-3, wherein the at least one first computing device of the first-type CSP is further configured to automatically verify a signature-of-trust of a node via which the at least one first computing device receives, from a user device associated with a user, at least one first request to perform the at least one blockchain-based activity with the at least one crypto-token.

Clause 5. The system of Clause 1-4, further comprising:
at least one digital wallet (eWallet) comprising at least one first graphical user interface configured to allow a user to perform the at least one blockchain-based activity based on a user instruction related to the at least one position in the at least one non-crypto asset.

Clause 6. The system of Clause 5, wherein the at least one first computing device of the first-type CSP is further configured to transmit at least one message, via the blockchain, from a first eWallet of a first user to a second eWallet of a second user.

Clause 7. The system of Clause 6, wherein the first eWallet comprises at least one second graphical user interface configured to allow the first user to indicate a maximum number of computational steps to be taken to transmit the at least one message, via the blockchain, to the second eWallet of the second user.

Clause 8. The system of Clauses 1-7, wherein the at least one first computing device of the first-type CSP is further configured to:
secretly keep at least one private key of the at least one crypto-token and
restrict a user to withdraw the at least one crypto-token to a corresponding value of at least one pre-determined cryptocurrency, at least one predetermined FIAT currency, or both.

Clause 9. The system of Clauses 1-8, wherein the at least one first computing device of the first-type CSP is further configured to track a monetary value of the at least one crypto-token based, at least in part, on a monetary value of the at least one position in the at least one non-crypto asset.

Clause 10. The system of Clause 5-6, wherein the eWallet further comprises at least one second graphical user interface configured to display a monetary value of the at least one crypto-token based, at least in part, on a monetary value of the at least one position in the at least one non-crypto asset.

Clause 11. A computer-based method comprising:
administering a dual-exchange cryptographically-secured platform (DECSP);
wherein the DECSP comprises:
3) a first-type cryptographically-secured platform (first-type CSP) and
4) a second-type cryptographically-secured platform (second-type CSP); wherein the first-type CSP comprises at least one first computing device; wherein the second-type CSP comprises at least one second computing device
wherein the at least one first computing device is operationally connected to a blockchain and configured to at least:
i) issue at least one digital cryptographical token (crypto-token) associated with at least one non-crypto asset,
ii) perform at least one blockchain-based activity with the at least one crypto-token,
iii) automatically cause to cryptographically generate, on a blockchain, at least one first blockchain immutable record of the at least one blockchain-based activity with the at least one crypto-token, and
iv) automatically transmit at least one instruction associated with the at least one non-crypto asset to the at least one second computing device of the second-type CSP in response to an issuance of the at least one crypto-token by the at least one first computing device of the first-type CSP;
wherein the at least one second computing device of the second-type CSP is configured to at least:
i) receive the at least one instruction associated with the at least one non-crypto asset from the at least one first computing device of the first-type CSP and
ii) automatically communicate with at least one non-crypto asset electronic marketplace to execute at least one transaction associated with the at least one non-crypto asset based on the at least one instruction to obtain at least one position in the at least one non-crypto asset; and
wherein the at least one first computing device of the first-type CSP, the at least one second computing device of the second-type CSP, or both, are configured to automatically link:
i) the at least one blockchain-based activity with the at least one crypto-token and
2) the at least one position in the at least one non-crypto asset.

Clause 12. The method of Clause 11, wherein the at least one first computing device of the first-type CSP, the at least one second computing device of the second-type CSP, or both, comprise a non-transitory computer memory storing computer code that, when executed, causes the at least one first computing device of the first-type CSP, the at least one second computing device of the second-type CSP, or both, to automatically execute at least one know-your-customer (KYC) determination.

Clause 13. The method of Clauses 11-12, wherein the at least one first computing device of the first-type CSP is further configured to automatically cause to cryptographically generate, on the blockchain, at least one second blockchain immutable record of the at least one position in the at least one non-crypto asset that is cryptographically linked to the at least one crypto-token.

Clause 14. The method of Clauses 11-14, wherein the at least one first computing device of the first-type CSP is further configured to automatically verify a signature-of-trust of a node via which the at least one first computing device receives, from a user device associated with a user, at least one first request to perform the at least one blockchain-based activity with the at least one crypto-token.

Clause 15. The method of Clause 11-14, further comprising:
administering at least one digital wallet (eWallet) that comprises at least one first graphical user interface configured to allow a user to perform the at least one blockchain-based activity based on a user instruction related to the at least one position in the at least one non-crypto asset.

Clause 16. The method of Clause 15, wherein the at least one first computing device of the first-type CSP is further configured to transmit at least one message, via the blockchain, from a first eWallet of a first user to a second eWallet of a second user.

Clause 17. The method of Clause 16, wherein the first eWallet comprises at least one second graphical user interface configured to allow the first user to indicate a maximum number of computational steps to be taken to transmit the at least one message, via the blockchain, to the second eWallet of the second user.

Clause 18. The method of Clause 11-17, wherein the at least one first computing device of the first-type CSP is further configured to:
secretly keep at least one private key of the at least one crypto-token and restrict a user to withdraw the at least one crypto-token to a corresponding value of at least one predetermined cryptocurrency, at least one predetermined FIAT currency, or both.

Clause 19. The method of Clause 11-18, wherein the at least one first computing device of the first-type CSP is further configured to track a monetary value of the at least one crypto-token based, at least in part, on a monetary value of the at least one position in the at least one non-crypto asset.

Clause 20. The method of Clause 15, wherein the eWallet further comprises at least one second graphical user interface configured to display a monetary value of the at least one crypto-token based, at least in part, on a monetary value of the at least one position in the at least one non-crypto asset.

While a number of embodiments of the present description have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added, and/or any desired steps may be eliminated).

What is claimed is:
1. A dual-exchange cryptographically-secured platform (DECSP) comprising:
1) a first-type cryptographically-secured platform (first-type CSP) that comprises:
a blockchain and
at least one first computing device configured to at least:

35 i) issue at least one digital cryptographical token corresponding to at least one position in at least one non-crypto asset (asset-linked crypto-token), ii) in response to the issuance of the at least one asset-linked crypto-token, automatically transmit, to at least one second computing device of a second-type CSP, at least one first trading instruction to obtain the at least one position in the at least one non-crypto asset, iii) in response to receiving a sell request to sell the at least one asset-linked crypto-token, automatically transmit, to the at least one second computing device of the second-type CSP, at least one second trading instruction to close the at least one position in the at least one non-crypto asset, iv) automatically cause to cryptographically generate, on the blockchain, at least one first blockchain immutable record for at least one blockchain-based transaction with the at least one asset-linked crypto-token between users of the first-type CSP, v) automatically cause to automatically generate, on the blockchain, at least one second blockchain immutable record that links:
  i) the at least one asset-linked crypto-token,
  ii) the at least one position in the at least one non-crypto asset, and
  iii) a timestamp identifying when the position in the at least one non-crypto asset has been obtained, and vi) track a value of the at least one asset-linked crypto-token based, at least in part, on the at least one second blockchain immutable record; and 2) the second-type CSP comprising the at least one second computing device configured to at least:
  i) in response to receiving the at least one first trading instruction, automatically communicate with at least one non-crypto asset electronic marketplace to obtain the at least one position in the at least one non-crypto asset, and
  ii) in response to receiving the at least one second trading instruction, automatically communicate with the at least one non-crypto asset electronic marketplace to close the at least one position in the at least one non-crypto asset.

2. The DECSP of claim 1, wherein the at least one first computing device of the first-type CSP, the at least one second computing device of the second-type CSP, or both, comprise a non-transitory computer memory storing computer code that, when executed, causes the at least one first computing device of the first-type CSP, the at least one second computing device of the second-type CSP, or both, to automatically execute at least one know-your-customer (KYC) determination.

3. The DECSP of claim 1, wherein the at least one first computing device of the first-type CSP is further configured to automatically verify a signature-of-trust of a node via which the at least one first computing device receives, from a user device associated with a user, at least one first request to perform the at least one blockchain-based transaction with the at least one asset-linked crypto-token.

4. The DECSP of claim 1, further comprising:
at least one digital wallet (eWallet) comprising at least one first graphical user interface configured to allow a user to perform the at least one blockchain-based transaction based on a user instruction related to the at least one position in the at least one non-crypto asset.

36

5. The DECSP of claim 4, wherein the at least one first computing device of the first-type CSP is further configured to transmit at least one message, via the blockchain, from a first eWallet of a first user to a second eWallet of a second user.

6. The DECSP of claim 5, wherein the first eWallet comprises at least one second graphical user interface configured to allow the first user to indicate a maximum number of computational steps to be taken to transmit the at least one message, via the blockchain, to the second eWallet of the second user.

7. The DECSP of claim 4, wherein the at least one eWallet further comprises at least one second graphical user interface configured to display the value of the at least one asset-linked crypto-token based, at least in part, on the at least one position in the at least one non-crypto asset.

8. The DECSP of claim 1, wherein the at least one first computing device of the first-type CSP is further configured to:
secretly keep at least one private key of the at least one asset-linked crypto-token and
restrict a user to withdraw the at least one asset-linked crypto-token to a corresponding value of at least one pre-determined cryptocurrency, at least one predetermined FIAT currency, or both.

9. The method of claim 1, further comprising:
secretly keeping, by the at least one first computing device, at least one private key of the at least one asset-linked crypto-token; and
restricting, by the at least one first computing device, a user to withdraw the at least one asset-linked crypto-token to a corresponding value of at least one pre-determined cryptocurrency, at least one predetermined FIAT currency, or both.

10. A computer-based method comprising:
providing a first-type cryptographically-secured platform (first-type CSP) that comprises:
a blockchain and
at least one first computing device;
issuing, by the at least one first computing device, at least one digital cryptographical token corresponding to at least one position in at least one non-crypto asset (asset-linked crypto-token);
in response to the issuance of the at least one asset-linked crypto-token, automatically transmitting, by the at least one first computing device, to at least one second computing device of a second-type CSP, at least one first trading instruction to obtain the at least one position in the at least one non-crypto asset;
in response to receiving a sell request to sell the at least one asset-linked crypto-token, automatically transmitting, by the at least one first computing device, to the at least one second computing device of the second-type CSP, at least one second trading instruction to close the at least one position in the at least one non-crypto asset;
automatically causing, by the at least one first computing device, to cryptographically generate, on the blockchain, at least one first blockchain immutable record for at least one blockchain-based transaction with the at least one asset-linked crypto-token between users of the first-type CSP;
automatically causing, by the at least one first computing device, to automatically generate, on the blockchain, at least one second blockchain immutable record that links:

i) the at least one asset-linked crypto-token, ii) the at least one position in the at least one non-crypto asset, and iii) a timestamp identifying when the position in the at least one non-crypto asset has been obtained, and tracking, by the at least one first computing device, a value of the at least one asset-linked crypto-token based, at least in part, on the at least one second blockchain immutable record;

providing the second-type CSP comprising the at least one second computing device;

in response to receiving the at least one first trading instruction, automatically communicating, by the at least one second computing device, with at least one non-crypto asset electronic marketplace to obtain the at least one position in the at least one non-crypto asset, and in response to receiving the at least one second trading instruction, automatically communicating, by the at least one second computing device, with the at least one non-crypto asset electronic marketplace to close the at least one position in the at least one non-crypto asset.

11. The method of claim 10, further comprising: automatically executing, by the at least one first computing device, by the at least one second computing device, or by both, at least one know-your-customer (KYC) determination.

12. The method of claim 10, further comprising:
automatically verifying, by the at least one first computing device, a signature-of-trust of a node via which the at least one first computing device receives, from a user device associated with a user, at least one first request to perform the at least one blockchain-based activity with the at least one asset-linked crypto-token.

13. The method of claim 10, further comprising:
administering, by the at least one first computing device, at least one digital wallet (eWallet) that comprises at least one first graphical user interface configured to allow a user to perform the at least one blockchain-based transaction based on a user instruction related to the at least one position in the at least one non-crypto asset.

14. The method of claim 13, wherein the at least one first computing device of the first-type CSP is further configured to transmit at least one message, via the blockchain, from a first eWallet of a first user to a second eWallet of a second user.

15. The method of claim 14, wherein the first eWallet comprises at least one second graphical user interface configured to allow the first user to indicate a maximum number of computational steps to be taken to transmit the at least one message, via the blockchain, to the second eWallet of the second user.

16. The method of claim 13, wherein the at least one eWallet further comprises at least one second graphical user interface configured to display the value of the at least one asset-linked crypto-token based, at least in part, on the at least one position in the at least one non-crypto asset.

\* \* \* \* \*